(12) United States Patent
Morad et al.

(10) Patent No.: US 12,085,947 B2
(45) Date of Patent: Sep. 10, 2024

(54) TASK PERFORMING AGENT SYSTEMS AND METHODS

(71) Applicant: Kabushiki Kaisha Toshiba, Tokyo (JP)

(72) Inventors: Steven Morad, Cambridge (GB); Roberto Mecca, Cambridge (GB); Rudra Poudel, Cambridge (GB); Stephan Liwicki, Cambridge (GB); Roberto Cipolla, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 670 days.

(21) Appl. No.: 17/183,669

(22) Filed: Feb. 24, 2021

(65) Prior Publication Data

US 2022/0075383 A1    Mar. 10, 2022

(30) Foreign Application Priority Data

Sep. 10, 2020   (GB) .................................... 2014285

(51) Int. Cl.
*G05D 1/02*      (2020.01)
*G05D 1/00*      (2006.01)
(Continued)

(52) U.S. Cl.
CPC ......... *G05D 1/0221* (2013.01); *G05D 1/0088* (2013.01); *G05D 1/0214* (2013.01);
(Continued)

(58) Field of Classification Search
CPC ........ G05D 1/02; G05D 1/0221; G06N 20/00; G06V 20/56; G06F 18/213; G06F 18/214; B60W 60/0011; B60W 60/0059
(Continued)

(56) References Cited

U.S. PATENT DOCUMENTS 5,579,442 A    11/1996   Kimoto et al.
8,386,079 B1    2/2013   Kohler et al.
(Continued)

FOREIGN PATENT DOCUMENTS

CN    104680508 A    6/2015
CN    110991095 A    4/2020
(Continued)

OTHER PUBLICATIONS

Mousavian et al., "Visual Representations for Semantic Target Driven Navigation", ICRA, 2019, 7 pages.
(Continued)

*Primary Examiner* — Andrew Joseph Rudy
(74) *Attorney, Agent, or Firm* — Oblon, McClelland, Maier & Neustadt, L.L.P.

(57) ABSTRACT

A computer-implemented method for training an agent in a first context including an entity and an environment of the entity, to allow an apparatus to perform a navigation task in a second context comprising the apparatus and a physical environment of the apparatus, the apparatus adapted to receive images of the physical environment of the apparatus and comprising a steering device adapted to control the direction of the apparatus, the method comprising: obtaining one or more navigation tasks comprising: generating a navigation task; scoring the navigation task using a machine-learned model trained to estimate the easiness of tasks; in response to the score satisfying a selection criterion, selecting the navigation task as one of the one or more navigation tasks; and training the agent using a reinforcement learning method comprising attempting to perform, by the entity, the one or more navigation tasks using images of the environment of the entity.

20 Claims, 19 Drawing Sheets

(51) Int. Cl.
*G06F 18/214* (2023.01)
*G06N 20/00* (2019.01)
*G06V 20/56* (2022.01)

(52) U.S. Cl.
CPC .......... *G06F 18/214* (2023.01); *G06N 20/00* (2019.01); *G06V 20/56* (2022.01)

(58) Field of Classification Search
USPC ......................................................... 701/23
See application file for complete search history.

(56) References Cited

U.S. PATENT DOCUMENTS

| | | | |
|---|---|---|---|
| 9,157,757 B1* | 10/2015 | Liao | G05D 1/0253 |
| 10,962,372 B1* | 3/2021 | Rao | G01C 21/3484 |
| 11,531,330 B2* | 12/2022 | Huang | H04L 9/0637 |
| 11,556,844 B2* | 1/2023 | Chae | G05D 1/0221 |
| 11,631,151 B2* | 4/2023 | Cella | G05B 13/027 |
| | | | 701/1 |
| 2017/0252924 A1 | 9/2017 | Vijayanarasimhan et al. | |
| 2017/0273527 A1* | 9/2017 | Han | G01C 21/005 |
| 2018/0353042 A1* | 12/2018 | Gil | A47L 9/2826 |
| 2019/0339702 A1 | 11/2019 | Isele et al. | |
| 2020/0081436 A1 | 3/2020 | Kizumi | |
| 2020/0239024 A1 | 7/2020 | Srinivasan et al. | |
| 2021/0370511 A1* | 12/2021 | Hong | A47L 11/4061 |
| 2022/0017106 A1 | 1/2022 | Ota et al. | |

FOREIGN PATENT DOCUMENTS

| | | |
|---|---|---|
| EP | 3 667 556 A1 | 6/2020 |
| JP | 2017-168029 A | 9/2017 |
| JP | 2019-509905 A | 4/2019 |
| JP | 2019-125345 A | 7/2019 |
| JP | 2019-185742 A | 10/2019 |
| WO | WO 2018/220829 A1 | 12/2018 |
| WO | WO 2020/079074 A2 | 4/2020 |
| WO | WO 2020/113187 A1 | 6/2020 |
| WO | WO 2020/136770 A1 | 7/2020 |

OTHER PUBLICATIONS

Sax et al., "Learning to Navigate Using Mid-Level Visual Priors", $3^{rd}$ Conference on Robot Learning (CoRL 2019), 2019, 23 pages.
Mirowski et al., "Learning to Navigate in Complex Environments", ICLR, 2017, 16 pages.
Zhu et al., "Target-driven Visual Navigation in Indoor Scenes using Deep Reinforcement Learning", ICRA, 2017, 8 pages.
Yamauchi, "A Frontier-Based Approach for Autonomous Exploration", IEEE, 1997, http://www.robotfrontier.com/papers/circa97.pdf, 6 pages.
Combined United Kingdom Search and Examination Report issued on Mar. 16, 2021 in GB Application No. 2014285.7, 7 pages.
Japanese Office Action issued Jul. 26, 2022 in Japanese Patent Application No. 2021-042252 (with English translation), 10 pages.
Redmon, J., et al., "Real-time grasp detection using convolutional neural networks", 2015 IEEE International Conference on Robotics and Automation (ICRA), May 1, 2015 (May 1, 2015), pp. 1316-1322, SP055288285.
Krizhevsky, A., et al., "ImageNet classification with deep convolutional neural networks", the 26th annual conference on neural information processing systems (NIPS 25): Dec. 3-8, 2012, Dec. 2, 2012 (Dec. 6, 2012), XP55113686, Retrieved from the internet: URL http://books.nips.cc/papers/files/nips25/NIPS2012_0534.pdf, pp. 84-90.

* cited by examiner

TASK PERFORMING AGENT SYSTEMS AND METHODS

CROSS REFERENCE TO RELATED APPLICATION

This application claims the benefit of United Kingdom Application number 2014285.7 filed on Sep. 10, 2019, which is hereby incorporated by reference.

FIELD

Embodiments described herein are concerned with task performing agent systems and methods, and methods and systems for the training thereof.

BACKGROUND

Agent systems and methods control entities, which could be real (e.g. physical) or simulated, based on observations of their context, e.g. based on observations of the environment of the entity and/or the state of the entity. Such agents may control the entity to perform a series of actions in order to perform a specified task. One task in which existing agents struggle is navigating within cluttered, realistic indoor environments. In particular, agents struggle to control entities to navigate to goal objects while avoiding collisions in these environments. Being able to navigate while avoiding collisions is important in facilitating robots to perform tasks such as carrying heavy boxes through an office hallway, bussing a table at a restaurant, delivering syringes to hospital operating rooms, and autonomous exploration for disaster recovery, where offline maps are unlikely to be unavailable. Thus, overcoming the described limitations of existing navigation agents may facilitate the use of robots for a wider array of tasks and in a wider array of contexts, such as those described.

Existing agents may be based on classical approaches, referred to as classical agents, and may utilize non-learned policies, e.g. using fixed algorithms for responding to observations in the environment. However, these agents are not able to generalize in real-world contexts so cannot adapt to novel situations making their practical utility limited outside of set or predictable contexts.

More recently agents trained using deep reinforcement-learning techniques have seen considerable success in certain contexts, e.g. playing simple arcade games, and have shown considerably better generalization ability than classical agents. Agents trained using deep reinforcement-learning techniques use one or more neural networks to determine actions to be performed by the entity based on observations of the context. During training, the agent causes the entity to perform actions and a reward is calculated based on the context subsequent to performing the action, and parameters of the one or more neural networks to maximise this reward. The reward may be based on whether the performed action achieves and/or makes progress towards a goal, e.g. completing a task, that the agent is being trained to perform.

DETAILED DESCRIPTION

Figure 1A:
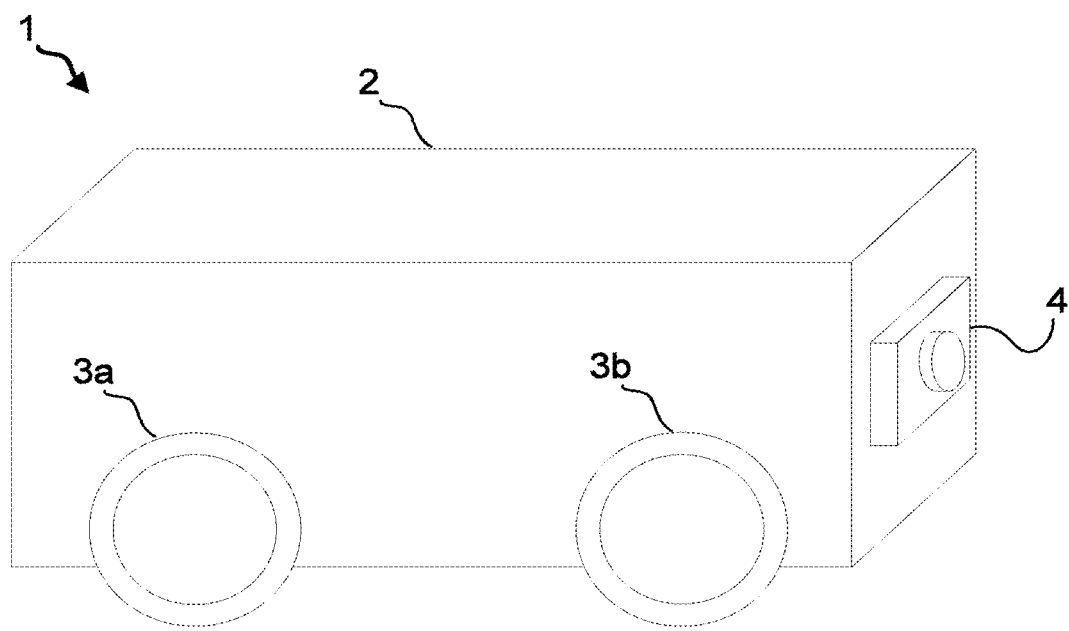
FIG. 1A is an illustration of an autonomous wheeled vehicle in accordance with example embodiments.

In a first embodiment, a computer-implemented method is provided for training an agent in a first context comprising an entity and an environment of the entity, to allow an apparatus to perform a navigation task in a second context comprising the apparatus and a physical environment of the apparatus. The apparatus is adapted to receive images of the physical environment of the apparatus. The apparatus comprises a steering device adapted to control the direction of the apparatus. The method comprises obtaining one or more navigation tasks; and training the agent using a reinforcement learning method comprising attempting to perform, by the entity, the one or more navigation tasks using images of the environment of the entity. Obtaining the one or more navigation tasks comprises: generating a navigation task; scoring the navigation task using a machine-learned model trained to estimate the easiness of tasks; and in response to the score satisfying a selection criterion, selecting the navigation task as one of the one or more navigation tasks.

The above embodiment facilitates the training of agents that are able to control an apparatus in perform or at least better perform navigation tasks. The improvements in the training of the agent may also reduce the number of actions and/or parameter updates performed in the training of agent. Hence, the provided improvements reduce computational resource usage in the training of the agent. By being able to control apparatus to better perform navigation tasks, the trained agents also reduce the energy usage of the apparatus as incorrect movements by the apparatus that waste energy will be reduced.

The apparatus may be a vehicle, such as an autonomous guided vehicle or an unmanned aerial vehicle.

A navigation task may be defined by a start location for the apparatus and a target location for the apparatus.

The generation of the navigation task may be a generation of a random (or pseudorandom) navigation task.

The scoring of the navigation task may be based on one or more properties of the navigation task. The one or more properties of the navigation task may be or include one or more geometric properties of the navigation task. The one or more properties of the navigation task may be an input to or the input to the machine-learned model.

The machine-learned model may be trained to estimate the easiness of navigation tasks based on a training set comprising, for each of a plurality of navigation tasks, one or more properties of the respective navigation task and an indication of whether an attempt to perform the navigation task satisfied a navigation task success criterion.

The navigation task success criterion may be satisfied if the entity was navigated by the agent to a target location in the environment of the entity. A target object may be at or proximate to the target location. The target object may be an object in a target semantic class.

The machine-learned model may include a feed-forward neural network. The feed-forward neural network may be a fully connected neural network.

Training feed-forward neural networks takes less time and utilizes fewer computational resources than comparable neural networks of other types, e.g. convolutional neural networks or recurrent neural networks.

The machine-learned model may be trained in conjunction with the agent, such that the machine-learned model scores the tasks based on the current abilities of the agent. For example, the machine-learned model may estimate an easiness, such as a success probability, for the agent at the current iteration in training.

The score may satisfy the selection criterion if the score indicates that the navigation task is of intermediate easiness.

Navigation tasks of intermediate easiness are beneficial for use in training of agent as intermediate easiness tasks facilitate better and/or more efficient training of the agent by providing more learning signal for policy improvement than random tasks as they teach the agent to solve new tasks at its current ability. Thus, navigation tasks of intermediate easiness may improve the navigation performance of the agent in use, and/or reduce the time and/or computational resources used in training the agent.

The score may indicate that the navigation task is of intermediate easiness if the score is within a determined range. Determining the range may include: generating a plurality of navigation tasks; scoring, using the machine-learned model, the plurality of navigation tasks; and calculating the range based on the corresponding plurality of scores of each of the plurality of navigation tasks.

The score may satisfy the selection criterion if the score indicates that the navigation task is of intermediate difficulty.

The score may indicate that the navigation task is of intermediate difficulty if the score is within a determined range. Determining the range may include: generating a plurality of navigation tasks; scoring, using the machine-learned model, the plurality of navigation tasks; and calculating the range based on the corresponding plurality of scores of each of the plurality of navigation tasks.

The range may be calculated based on one or more summary statistics for corresponding plurality of scores of each of the plurality of navigation tasks.

Obtaining the one or more navigation tasks may include: generating a second navigation task; scoring the second navigation task using the machine-learned model trained to estimate the easiness of tasks; and in response to the score satisfying a second selection criterion, selecting the second navigation task as one of the one or more navigation tasks.

The generation of the second navigation task may be a generation of a random (or pseudorandom) navigation task.

The score may satisfy the second selection criterion if the score indicates that the second navigation task is easy.

Easy navigation tasks are beneficial in the training of the agent as they may alleviate catastrophic forgetting. For example, during training, an agent may forget how easier navigation tasks may be performed if it is only trained on tasks of greater difficulty.

The score may indicate that the navigation task is easy if the score is greater than a threshold score. Determining the threshold score may include: generating a plurality of navigation tasks; scoring, using the machine-learned model, the plurality of navigation tasks; and calculating the threshold score based on the corresponding plurality of scores of each of the plurality of navigation tasks.

The threshold score may be calculated based on one or more summary statistics of the corresponding plurality of scores of each of the plurality of navigation tasks.

Obtaining the one or more navigation tasks may include: generating a third navigation task; and selecting the third navigation task as one of the one or more navigation tasks. The generation of the third navigation task may be a generation of a random (or pseudorandom) navigation task.

Random (or pseudorandom) navigation tasks are beneficial in training the agent as they introduce entropy into the training of the agent which may prevent the agent being overfitted to certain types of navigation tasks.

Attempting to perform, by the entity, the one or more navigation tasks using images of the environment of the entity may include performing one or more action steps. Each action step may include: receiving one or more images of the environment of the entity; determining, using the agent, one or more actions of a plurality of actions performable by the entity in the environment of the entity based on the one or more images; causing the one or more actions to be performed; and calculating a reward for training the agent using the reinforcement-learning method based on an updated state of the first context and a navigation task success criterion.

The calculated reward may be increased in response to the updated state of the first context being different from previous states of the first context.

Increasing the calculated reward in response to the update state being different from previous states encourages exploration and may prevent the training agent being caught in a local minima during training.

The calculated reward may also be increased in response to the distance travelled.

Increasing the calculated reward in response to the distance travelled encourages exploration and prevents the agent remaining in its current location and/or spinning before it has achieved a success criterion.

The calculated reward may be decreased in response to the updated state of the first context indicating that the training entity has collided with one or more objects in the training environment.

Decreasing the calculated reward in response to collisions leads to the training of an agent that controls the apparatus to navigate without collisions or at least navigate with fewer collisions than would otherwise occur. This reduces damage or at least wear and tear to the apparatus that results from such collisions, and reduces damage to the objects with which the apparatus would collide. Energy consumption by the apparatus may also be reduced as the momentum of the apparatus would be reduced by collisions.

The first entity may be simulated entity. The environment of the first entity may be a simulated environment.

Training the agent using a simulated entity and a simulated environment removes or at least reduces the use of an apparatus in the training of the agent. Consequently, as actions are not performed by said apparatus in training, energy use in the training of the agent is reduced. Furthermore, training the agent in a simulated environment may be significantly quicker as performing actions by a simulated entity in a simulated environment is faster, typically orders of magnitude faster, than performing actions by an apparatus in a physical environment.

The agent may include one or more feature networks configured to process one or more images to determine one or more latent features.

The agent may further include a policy network configured to process the one or more latent features to determine one or more action values for one or more actions performable by the entity in the environment of the entity.

The one or more feature networks may be pretrained using a plurality of images of a physical environment.

Using feature networks pretrained using a plurality of images of a physical environment facilitates the training of an agent in a simulated environment that can control an apparatus in a physical environment.

The parameters of the one or more feature networks may be frozen when training the agent.

Freezing the parameters of the one or more feature networks during training prevents or at least reduces overfitting of the one or more feature networks to a simulated environment. Hence, as the agent is not overfitted or is less overfitted to the simulated environment, the agent is better able to control apparatus in a physical environment.

The one or more feature networks may include one or more spatial feature networks.

The one or more spatial feature networks may include one or more convolutional neural network layers.

The one or more feature networks may include one or more semantic target feature networks.

The one or more semantic target feature networks may include one or more convolutional neural network layers.

The one or more semantic target feature networks may include one or more post-processing layers. The one or more post-processing layers may be configured to extract a binary mask for an object class of the one or more object classes, wherein the object class is based on a settable label.

Specification of the one or more object classes based on a settable label may facilitate setting of an object class at runtime, and, thus, use of the trained agent to control the apparatus to navigate to target objects in object classes that were not seen during the training of the agent.

The policy network may include feature-compression section.

The policy network may include a memory section. The memory section may include one or more long-short term memory (LSTM) layers and/or one or more gradient recurrent unit (GRU) layers.

According to a second embodiment, there is provided a computer-implemented method for controlling an apparatus to perform a navigation task in a physical environment of the apparatus. The apparatus is adapted to receive images of the physical environment of the apparatus. The apparatus includes a steering device adapted to control the direction of the apparatus. The method includes receiving one or more images of the physical environment of the apparatus; determining, using an agent trained according to a method according to the first embodiment, one or more actions of a plurality of actions performable by the apparatus based on the one or more images; and causing the one or more actions to be performed by the apparatus.

According to a third embodiment, there is provided a system including one or more processors configured to perform a method according to the second embodiment.

The system may include the apparatus controlled by the method.

While the preceding three aspects relate to navigation tasks, it should be understood that details described therein may be applied in the context of a variety of task types.

According to a fourth embodiment, there is provided a computer-implemented method for training an agent, including: obtaining one or more tasks wherein each task of the one or more tasks defines one or more success criteria, including: generating a task; estimating, using a task easiness estimation function, an easiness of the generated task; determining that the estimated easiness of the generated task is in an intermediate easiness range; and in response to determining that the easiness for the generated task is in the intermediate easiness range, selecting the generated task as a task of the one or more tasks; training the agent in a training context, including: for each task of the one or more tasks: attempting performance of the task by the agent, wherein is terminated in response to either at least one of the one or more success criteria defined by the task being satisfied or at least one of one or more failure criteria being satisfied; and updating parameters of the agent based on the attempted performances of each task by the agent; determining one or more task properties for each task of the one or more tasks; and training the task easiness estimation function, based on a training set including, for each task of the one or more tasks, the one or more properties of the task and an indication of whether attempting performance of the task resulted in at least one of the one or more success criteria being satisfied.

Training the task easiness estimation function may include: calculating one or more losses, based on the training set, using a loss function; and updating, based on the one or more losses, the parameters of the task easiness estimation function.

Generating the task may include generating a random task.

The method may further include determining the intermediate easiness range. Determining the intermediate easiness range may include: generating a plurality of tasks; estimating, using the task easiness estimation function, a corresponding plurality of estimated easinesses of each of the plurality of random tasks; and calculating the intermediate easiness range based on the corresponding plurality of estimated easinesses of each of the plurality of random tasks Obtaining the one or more tasks may include: generating a second task; estimating, using the task easiness estimation function, an estimated easiness of the second generated task; determining that the estimated easiness of the second generated task is greater than a threshold easiness; and in response to determining that the easiness of the second generated task is greater than the threshold easiness, selecting the second generated task as a task of the one or more tasks.

Obtaining the one or more tasks may include generating a third task; and selecting the third generated task as a task of the one or more tasks.

The estimated easiness function may include a feed-forward neural network.

The training context may include a training environment and a training entity.

The one or more success criteria may include a success criterion that is satisfied if a state of the training context comprises a state of the training entity that is equal to a target state of the training entity.

The one or more failure criteria may include a failure criterion that is satisfied if a maximum number of timesteps is reached.

Attempting performance of the task by the agent may include performing one or more action steps. Each action step may include receiving one or more observations of the training environment; determining, using the agent, one or more actions of a plurality of actions performable by the training entity in the training environment based on the one or more observations; causing the one or more actions to be performed by the training entity in the training environment; and calculating a reward based on an updated state of the training context and the one or more success criteria defined by the task.

Updating the parameters of the based on the attempted performance of each task by the agent, may include updating the parameters of the agent, based on a training set comprising, for each action step of the one or more action steps for each task of the one or more tasks, a representation of the state of the training entity at the beginning of the action step, the selected one or more actions, and the calculated reward.

The calculated reward may be increased in response to at least one of the one or more success criteria being satisfied.

The calculated reward may be increased in response to the updated state of the training context including an updated state of the training entity that is different from previous states of the training entity.

The calculated reward may be decreased in response to the updated state of the training context indicating that the training entity has collided with one or more objects in the training environment.

The agent may include one or more feature networks and one or more policy networks. Determining the one or more actions includes processing, using the one or more feature networks, the one or more observations to determine one or more latent features; and processing, using the policy network, the one or more latent features to determine a plurality of action values for the plurality of actions performable by the training entity in the training environment.

The one or more feature networks may be pretrained using a plurality of observations of one or more real environments.

The plurality of observations of one or more real environments may be a plurality of real images.

The one or more parameters of the one or more feature networks may be frozen when training the agent.

The one or more feature networks may include one or more spatial feature networks.

The one or more feature networks may include one or more semantic target feature networks.

The one or more semantic target feature networks may include one or more post-processing layers configured to extract a binary mask for an object class of the one or more object classes, wherein the object class is based on a settable label.

The one or more post-processing layers may be further configured to apply a max-pooling operation to an output based on the binary mask.

The policy network may include feature-compression section.

The policy network may include a memory section. The memory section may include one or more LSTM layers and/or one or more GRU layers.

The training entity may be a simulated entity.

The training environment may be a simulated environment.

According to a fifth embodiment, there is provided a computer-implemented method for controlling an entity to perform a task in a production environment. The method includes receiving one or more observations of the production environment; determining, using an agent trained according to a method according to the fourth embodiment, one or more actions of a plurality of actions performable by the entity in the production environment based on the one or more observations of the production environment; and causing the one or more actions to be performed by the entity in the production environment.

The entity may be a moveable entity. The plurality of actions may include one or more movement actions.

Controlling the entity in the production environment may include navigating the entity through the production environment.

The production environment may be a physical environment.

The entity may be an apparatus.

According to a sixth embodiment, a computer program, optionally stored on a non-transitory computer-readable medium, is provided. The computer program includes instructions which, when the program is executed by a computing apparatus, cause the computing apparatus to carry out a method according to the fourth embodiment.

According to a seventh embodiment, there is provided a system including one or more processors configured to perform a method according to the fourth embodiment.

The system may include the entity.

According to an eighth embodiment, there is provided a computer-implemented method including: obtaining one or more tasks, wherein each task of the one or more tasks defines an initial state and one or more success criteria; and training a policy network using a simulator configured to simulate a simulated entity in a simulated environment for each task of the one or more tasks: sending, to the simulator, an indication of the initial state defined by the task, wherein in response to receiving the indication of the initial state defined by the task, the simulator sets the state of the simulated based on the indication of the initial state; attempting performance of the task by the agent, including performing one or more action steps until either at least one of the one or more success criteria defined by the task is satisfied or at least one of one or more failure criteria is satisfied, each action step including: receiving, from the simulator, one or more images representing one or more views of the simulated environment based on the state of the simulated entity; processing, using the one or more feature networks, the one or more images to determine one or more latent features; processing, using the policy network, the one or more latent features to determine a plurality of action values for a plurality of actions performable by the simulated entity in the simulated environment; selecting, based on the plurality of action values, one or more actions of the plurality of actions; ending, to the simulator, an indication of the selected one or more actions, wherein, in response to receiving the indication of the selected one or more actions, the simulator updates the state of the simulated entity based on the selected one or more actions; and calculating a reward based on the updated state of the simulated entity and the target state defined by the task; and updating the parameters of the policy network based on a training set including, for each action step of the one or more action steps for each task of the one or more tasks, a representation of the state of the simulated entity at the beginning of the action step, the selected one or more actions, and the calculated reward.

To assist in understanding of embodiments described herein, a specific example is initially presented. It should be understood that this specific example is provided for assistance in understanding these embodiments, and it should not be considered as limiting the scope of the claims or the description thereafter.

Autonomous Wheeled Vehicle

FIG. 1A is an illustration of an autonomous wheeled vehicle 1, e.g. an automated guided vehicle, in accordance with example embodiments.

The autonomous wheeled vehicle 1 includes a body 2, wheels 3, and a camera 4. The autonomous wheeled vehicle 1 may include additional elements to those shown, for example: a vacuum suction element such that the automated wheeled vehicle can be used as an automatic vacuum cleaner; and/or a fork and/or a cargo bed such that objects can be collected and/or delivered by the autonomous wheeled vehicle.

The body 2 includes one or more motors that can be used to rotate the wheels 3 and a steering system, e.g. a rack and pinion, whereby at least some of the wheels 3 can be turned to move in a desired direction. The body 2 also includes a control system, e.g. one or more computing devices that can be used to cause movements to be performed. For example, the control system may cause the wheels to be rotated by the motor to move the automated wheeled vehicle forwards (and, if supported, to rotate the wheels in the opposite direction, to move the autonomous vehicle backwards) and cause the steering system to rotate the wheels to turn the autonomous vehicle. The control system may determine the movements to be performed itself, e.g. using the method described with respect to FIG. 1D, or may receive an indication of the action to be performed from an external computer system using network hardware, e.g. a wireless transceiver. The body 2 also includes a power source (e.g. a battery and/or a solar panel) or a connection to a power source (e.g. a mains connection) such that energy can be provided to the one or more motors, the steering system, and the control system.

The wheels 3 may include four wheels: the wheels 3a, 3b and two wheels (not shown) opposite to these, e.g. positioned against the opposite side (not shown) of the body 2 to the wheels 3a, 3b. Each two wheels of the four wheels, e.g. the wheel 3a and the wheel opposite, and the wheel 3b and the wheel opposite, may be connected by an axle extending through the body 2. At least one of the axles may be connected to the motor such that the respective two wheels connected to it can be rotated by the motor. At least one of the axles may be connected to the steering system such that the respective two wheels can be turned using the steering system.

The camera 4 is capable of capturing images. In this embodiment, a single camera is provided capturing 2D images. The camera is coupled to the control system in the body 2. The camera is configured to capture one or more images, e.g. in response to a request received from the control system, and to send the one or more images to the control system. The control system may process the one or more images itself to determine the one or more movements to be performed based on the one or more images or may transmit the one or more images to an external computer system, using network hardware such as a wireless transceiver, so that the external computer system can determine the one or more movements to be performed based on the one or more images.

Autonomous Aerial Vehicle

Figure 1B:
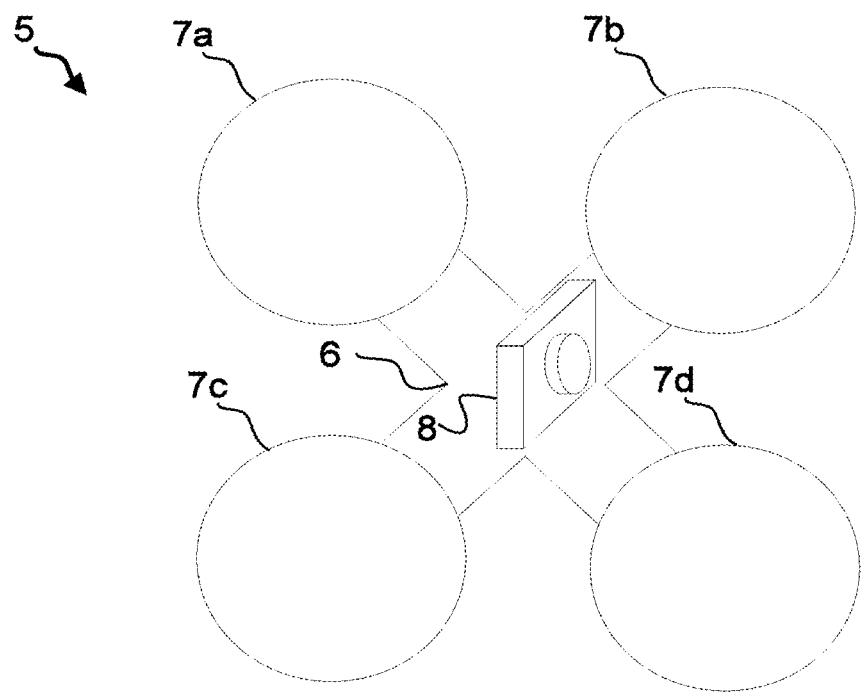
FIG. 1B is an illustration of an autonomous aerial vehicle in accordance with example embodiments.

FIG. 1B is an illustration of an autonomous aerial vehicle 5, e.g. an unmanned aerial vehicle or drone, in accordance with example embodiments.

The autonomous aerial vehicle 5 includes a body 6, propellers 7, and a camera 8. The autonomous wheeled vehicle 8 may include additional elements to those shown. For example, a payload holding or attachment element, such that the autonomous aerial vehicle can be used to collect and/or deliver objects.

The body 6 includes a respective motor for each of the propellers 7 which can be used to rotate the respective propeller. The body 6 also includes a control system, e.g. one or more computing devices that can be used to cause movements to be performed. For example, the control system may cause the motor to rotate the propellers and control the speed at which the motor rotates the propellers, such that the autonomous aerial vehicle can ascend and descend, move forwards and/or backwards, and turn. The control system may determine the movements to be performed itself, e.g. using the method described with respect to FIG. 1D, or may receive an indication of the action to be performed from an external computer system using network hardware, e.g. a wireless transceiver. The movements determined and/or received may be at a higher level of abstraction than the operations performable by the autonomous aerial vehicle, and the control system may translate these more abstract movements into operations performable by the aerial vehicle. For example, the more abstract movements may be move forwards, turn left and turn right, and the control system may translate these into differentials between the speeds at which the propellers 7 are rotated by the motor. The body 6 also includes a power source (e.g. a battery and/or a solar panel) or a connection to a power source (e.g. a mains connection) such that energy can be provided to the one or more motors and the control system.

The propellers 7 may include four propellers 7a, 7b, 7c and 7d. As described, each of the propellers 7a-7d may be rotated by a respective motor located on the body 6, and one or more of the propellers 7a-7d may be rotated at a different speed to another one or more of the propellers 7a-7d such that the aerial autonomous vehicle 5 turns left or right, or moves forward.

The camera 8 is capable of capturing images. In this embodiment, a single camera is provided capturing 2D images. The camera is coupled to the control system in the body 6. The camera is configured to capture one or more images, e.g. in response to a request received from the control system, and to send the one or more images to the control system. The control system may process the one or more images itself to determine the one or more movements to be performed based on the one or more images or may transmit the one or more images to an external computer system, using network hardware such as a wireless transceiver, so that the external computer system can determine the one or more actions to be performed based on the one or more images.

Example Environment

Figure 1C:
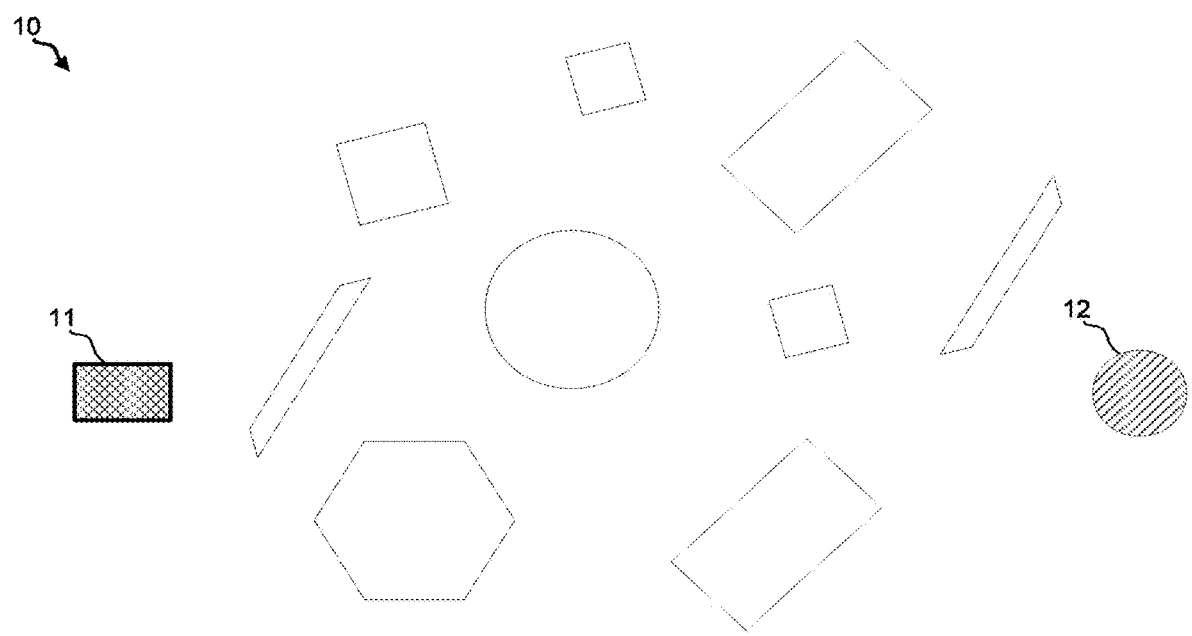
FIG. 1C is an illustration of an example environment that can be navigated by an autonomous vehicle in accordance with example embodiments.

FIG. 1C is a plan view illustration of an example environment 10 that can be navigated using an agent in accordance with example embodiments.

The example environment 10 includes an autonomous vehicle 11, e.g. the autonomous wheeled vehicle 1 or the autonomous aerial vehicle 5, and a target object 12, e.g. a ball or vase, to be navigated to by the autonomous vehicle from its current position. As is illustrated, there are obstacles between the autonomous vehicle 11 and the target object 12. To avoid damage to the autonomous vehicle 11 and the obstacles, and to avoid getting stuck on the obstacles, the autonomous vehicle 11 avoids collisions with the obstacles when navigating to the target object 12.

The example environment 10 may be a cluttered indoor environment, e.g. an office or home, and may include obstacles such as tables, chairs, shelves, bookcases, storage units, boxes, electronic devices, and power cables.

Example Navigation Method

Figure 1D:
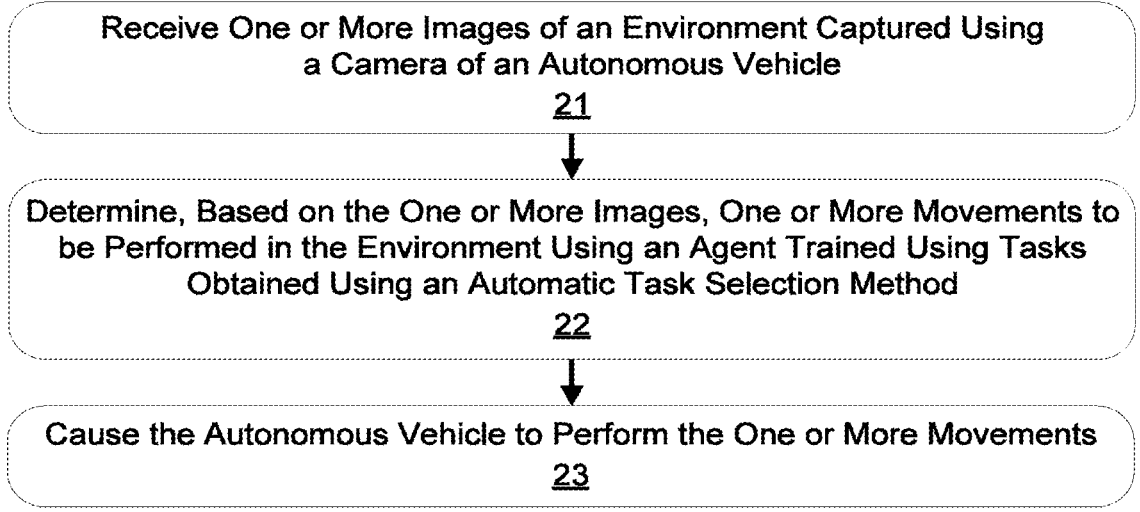
FIG. 1D is a flow diagram of a method for navigating an autonomous vehicle in an environment in accordance with example embodiments.

FIG. 1D is a flow diagram of a method 21 for navigating an autonomous vehicle, e.g. the autonomous wheeled vehicle 1 or the autonomous aerial vehicle 5, in an example environment, e.g. the example environment 11, in accordance with example embodiments. The example method may be implemented as one or more computer-executable instructions executed by one or more computing devices, e.g. the computing device 700 described in relation to FIG. 7. The one or more computing devices may be internal to the autonomous vehicle, e.g. a control system located in the body, or may be external to the autonomous vehicle.

In step 21, one or more images of the environment are received. The one or more images are one or more images captured using a camera of the autonomous vehicle, e.g. camera 4 or camera 8. Where the one or more computing devices performing the method are internal to the autonomous vehicle, the one or more images may be received over one or more wired connections between the camera and the one or more computing devices. Where the one or more computing devices performing the method are external to the autonomous vehicle, the one or more images may be transmitted to the one or more computing devices using network hardware of the autonomous vehicle, e.g. a wireless transceiver.

In step 22, one or more movements to be performed in the environment are determined based on the one or more images using an agent.

The agent has been trained using tasks obtained using an automatic task selection method, such as that described in relation to FIG. 2 and FIG. 3A-3C. The tasks are navigation tasks where the agent attempts to navigate an entity, e.g. the autonomous vehicle 11, under its control to a target object, e.g. the target object 12, in an environment containing obstacles, e.g. the environment 10. The agent has been trained by attempting performance of these tasks and updating parameters of the agent, e.g. using a reinforcement-learning method, based on the agent's performance at the task, e.g. whether it successfully reaches the target object or collides with objects. Agent's trained using tasks obtained with the automatic task selection method are trained on tasks of a suitable difficulty for the agent, e.g. tasks determined to be moderately easy for the agent to perform. An agent trained using tasks of a suitable difficulty is better able to determine appropriate movements for navigating an entity under its control to a target object, and resultantly an agent that is better able to navigate an entity to the target object, e.g. better able to navigate the autonomous vehicle to the target object.

The agent may have been trained using a simulator. For example, the agent may have been trained by attempting to perform tasks by moving a simulated vehicle, e.g. a simulated wheeled vehicle, in a simulated environment, e.g. a simulated cluttered indoor environment. However, the agent may have been trained using a simulator that can render substantially photorealistic images representing a camera view of the simulated vehicle, and may include feature networks pretrained using real images, such that, despite being trained in a simulator, the agent is able to determine appropriate movements for navigating the autonomous vehicle based on the one or more images.

The agent may be configurable such that it can navigate the autonomous vehicle to target objects of a specified semantic type, e.g. a vase. This functionality may be facilitated by the agent including a semantic target feature network pretrained on real images of common objects in context, which can be configured by setting a label specifying the semantic type of objects to target. Such agents may be able to navigate to target objects of semantic types that were not included in the tasks attempted by the agent during training. For example, the agent may have only attempted tasks navigating to ball target objects but, by setting the label to specify that vases should be targeted, may navigate the autonomous vehicle to a vase.

Agents trained using the described methods are able to generalize such that an agent trained for use with a given entity or type thereof are able to be used for other entities or types thereof. For example, an agent trained for navigating an autonomous wheeled vehicle, e.g. trained by attempting performance of tasks by moving a simulated wheeled vehicle, may be used for navigating an autonomous aerial vehicle.

Agents trained using the described methods may be capable of determining appropriate actions for navigating an autonomous vehicle under its control to a target object based on one or more images captured using a single camera, such that multiple cameras and/or multimodal input are not required for navigation. For example, images captured using the single camera 4 of the automated wheeled vehicle 1 or the single camera 8 of the automated aerial vehicle may be sufficient to navigate the respective entity.

In step 23, the autonomous vehicle is caused to perform the one or more movements. Where the one or more computing devices for performing the method are internal to the autonomous vehicle, causing performance of the one or more movements may include causing appropriate operations by components of the autonomous vehicle. For example, where the autonomous vehicle is an autonomous wheeled vehicle, causing rotation of the wheels to move the autonomous wheeled vehicle forward or turning of the wheels to turn the autonomous wheeled vehicle, or, where the autonomous vehicle is an autonomous aerial vehicle, causing rotation of the propellers at differing speeds as to cause the autonomous aerial vehicle to move forward, turn left or turn right. Where the one or more computing devices for performing the method are external to the autonomous vehicle, causing performance of the one or more movements may include transmitting indications of the one or more movements to be performed to the autonomous vehicle. A control system of the autonomous vehicle may receive these indications and cause appropriate operations to be performed by its components.

The systems and methods of the above embodiments attempt to improve task performing agents and the training thereof. Examples of tasks that may be performed include navigation tasks; object picking tasks, e.g. object picking in a warehouse and/or retail store; game playing tasks; manufacturing tasks; adaptive control tasks; and power systems control tasks. These improvements result in task performing agents that are able to perform tasks better than existing agents or in agents that are able to perform tasks that previous agents were incapable of performing. Where such agents perform tasks better than existing agents, the number of actions to perform a task and/or the number of attempts that the agent makes in attempting the task may be reduced. Furthermore, performing actions and/or task attempts consumes computational resources, and, where the task is being performed using an apparatus in a physical environment, consumes energy, e.g. to move the apparatus or a component thereof, and may result in wear and tear to the apparatus. Thus, in addition to the inherent advantage of performing task(s) better, the provided improvements reduce computational resource usage, energy usage, and wear and tear, in the performance of tasks by agents.

Improvements in the training of task performing agents may also reduce the number of actions and/or parameter updates performed in the training of agent. Performing actions and parameter updates consume computational resources. Thus, reducing the number of actions and/or parameter updates performed reduces the computational resources consumed during the training of the agent. Furthermore, where training involves performing actions and/or attempting tasks using an apparatus in a physical environment, training consumes energy, e.g. to move the apparatus or a component thereof, and may result in wear and tear to the apparatus. Thus, reducing the number of actions and attempts performed also reduces energy usage and wear and tear. Certain improvements in the training of task performing agents may also facilitate training of agents for use in physical environments without performing any actions or task attempts in physical environments or further reducing action performances and/or task attempts in physical environments, e.g. by training agents at least partly using a in a simulated environment. Consequently, the energy usage by the apparatus and wear and tear of the apparatus may be eliminated, or at least significantly reduced. Thus, in addition to the inherent advantages of training an agent that is able to perform task(s) better, the provided improvements reduce computational resource usage and may reduce energy usage, and apparatus wear and tear in the training of agents.

At least some of the described advantages may be particularly pronounced in embodiments providing improved agents for performing navigation tasks, or other tasks of which navigation is a component, using an apparatus in a physical environment. This is because both attempting to perform navigation tasks during training and in use with an agent with insufficient performance is liable to lead to collisions of the apparatus with the physical environment. Such collisions result in wear and tear to the apparatus, potential damage to the part of the environment that is collided with, and may in some cases be hazardous, e.g. collisions with humans. By reducing or eliminating the actions performed and/or tasks attempted in the physical environment during training and/or by improving the performance of the trained agent, collisions can be avoided, or at least minimised. Consequently, wear and tear to the apparatus, potential damage to the physical environment, and hazardous collisions can be avoided or at least significantly reduced.

As will become clear and may have been clear from the example previously given, at least some of the described embodiments relate to a variant of curriculum learning and, in particular, to automatic curriculum learning. The essence of curriculum learning is selecting and ordering training data in a way that produces desirable characteristics in the learner, e.g. an agent being trained. Automatic curriculum learning is the process of generating this curriculum without a human in the loop.

Training System

Figure 1E:
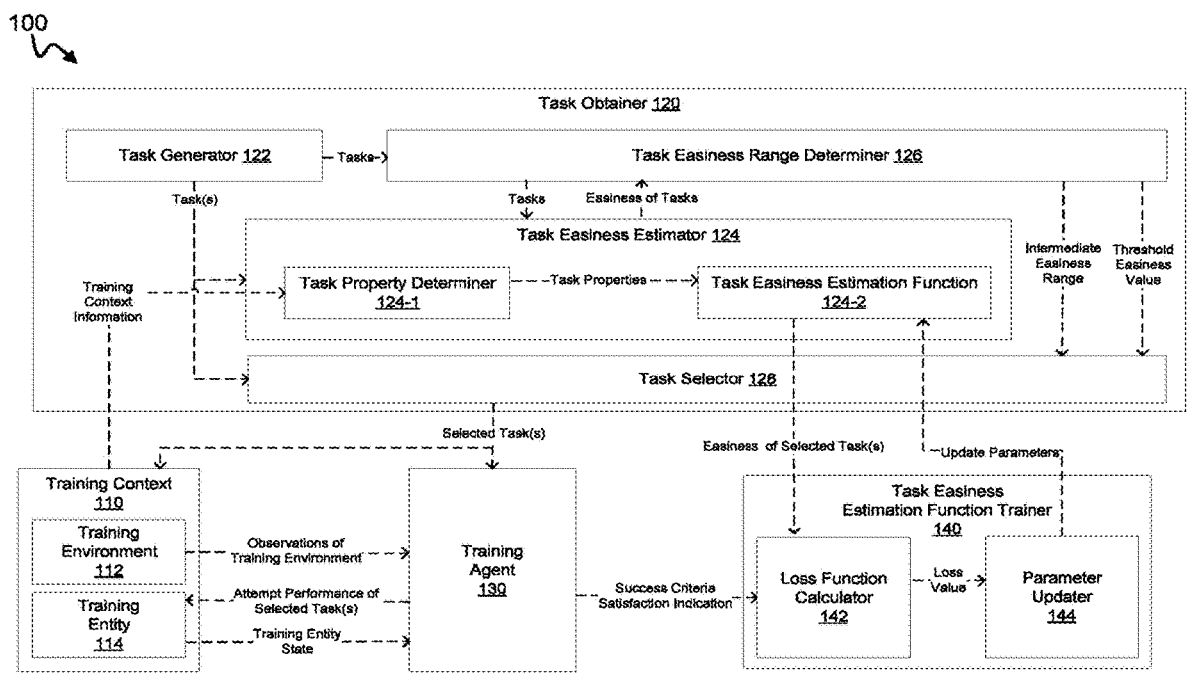
FIG. 1E is a schematic block diagram illustrating a system for training an agent in accordance with example embodiments.

FIG. 1E is a schematic block diagram illustrating a system 100 for training an agent in accordance with example embodiments. The system 100 may be implemented on or using one or more computing devices, e.g. computer hardware 700 described with respect to FIG. 7.

The system 100 includes a training context 110, task obtainer, training agent 130, and a task easiness estimation function trainer 140. These features of the system 100 may be implemented as one or more computer programs, e.g. computer-readable instructions executable by one or more processors, a script interpretable into executable instructions, and/or an intermediate representation, e.g. bytecode, translatable into executable instructions. While illustrated as distinct features for the purposes of explanation, it should be understood that any suitable combination of these aspects may be integrated into a single computer program. Similarly, it should be understood that one or more of these features may be implemented using multiple computer programs. The various features of the system 100 may communicate with one another, user libraries, system libraries, the operating system, and/or communicate within a features, using any suitable mechanism(s), e.g. API calls, remote service calls, message queues, interprocess communication (IPC) protocols, shared memory and/or persistent storage.

The training context 110 provides a context in which the training agent 130 may be trained to perform a task, e.g. a context within which the training agent 130 may cause actions to be performed and in which observations of the context may be made. The training context 110 may be a simulated context, e.g. a simulation of a real context, which may be implemented using a simulator, a virtual context, e.g. a video game, or may be a real context, e.g. a physical context. While a single training context is shown, it should be understood that a plurality of training contexts may be used. For example, a first training context may be used to perform initial training of the training agent 130, and one or more other training contexts used to perform further training of the agent. In some embodiments, the first training context may be a simulated training context, at least one of the one or more other training contexts may be a physical training context. The training context 110 may be different from a context in which the training agent 130 is to be used. For example, the training context 110 may be a simulated context, while the context in which the training agent 130 is to be used may be a real context.

The training context 110 may include a training environment 112 and a training entity 114.

The training environment 112 is an environment within which the training entity 114 may be caused to perform actions by the training agent 30. The training environment 112 may be a simulated environment, e.g. a simulation of a real environment, which may be implemented using a simulator, a virtual environment, e.g. a video game environment, or a real environment, e.g. a physical environment.

Training environments 112 may include obstacles, e.g. training environments 112 may be cluttered. For such a training environment 112 to be navigated, such obstacles may have to be navigated around and it may be desirable to avoid collision with such obstacles. Such training environments 112 may additionally or alternatively include objects and/or entities which can be interacted with. Some such objects and/or entities may be target objects and/or entities that are desired to be reached and/or interacted with. The target object may be any of a household object, e.g. ball, fan, a vase, a cupboard, or a desk; a room of a given type, e.g. bathroom, bedroom, study, private office, or stationery cupboard; an office object, e.g. a photocopier, video conferencing equipment, or a filing cupboard; industrial object classes, e.g. machinery of a given type, or an assembly line, or a position thereon; and/or medical object classes, e.g. pharmaceutical or medical devices of a given type.

For example, the training environment 112 may be a simulated or physical indoor environment, e.g. a home, office, factory or warehouse, or part thereof. The training environment 112 may alternatively be or additionally include a simulated or real outdoor environment, e.g. the training environment could be a simulated or physical park, stadium, a warehouse or factory complex including both indoor and outdoor sections, or a town. The training environment 112 may alternatively be a video game environment, e.g. a video game level, open world, multiplayer map, dungeon, or building. Video game environments may be two-dimensional or three-dimensional, or may include both two-dimensional and three-dimensional sections. Video game environments may resemble simulated indoor and/or outdoor environments. However, at least in some instances, they may show substantial differences from them, e.g. have non-realistic physics and/or allow for instantaneous movement between locations.

The training entity 114 is an entity that can be caused to perform actions by the training agent 130 within the training environment 112. The training entity 112 may be a simulated entity, e.g. a simulated entity, or a real entity, e.g. an apparatus, or a video game entity, e.g. a video game character or vehicle.

Training entities 114 may be capable of moving or being moved within the training environment. Such training entities 114 may also be capable of interaction with objects and/or other entities. The training entity 114 may be controlled by the training agent 130 to reach and/or interact with target objects and/or target other entities.

For example, the training entities 114 may be a simulated entity or a physical apparatus for and/or configured to be operated within an indoor environment, e.g. a simulated movable entity representing apparatus of one or more given types, an autonomous vacuum cleaner, an automated guided vehicle (AGV), a delivery or transport robot, a humanoid robot, or an industrial robot. The training entity may alternatively be a video game entity, e.g. a video game playable character, non-playable character (NPC), enemy, or vehicle.

It should be noted that, in some embodiments, the training entity 114 could be simulated, while the training environment 112 could be real. For example, a representation of a real environment could be captured, e.g. using one or more cameras, Lidar devices, and/or microphones, either once or continuously as the training environment 112, and the expected behaviour of an apparatus or person within such an environment could be simulated using a simulated entity 114.

The task obtainer 120 is used to obtain one or more tasks to be attempted by the agent during training of the agent.

The task obtainer 120 includes a task generator 122. The task generator generates one or more tasks of a type that may be attempted by the training agent 130 in the training context 110. For example, each task may be attempted by the training agent 130 by controlling the training entity 114 in the training environment 114. Each task may define an initial state, e.g. an initial state for the training context 110. Each task may also define one or more success criteria. The one or more success criteria may be or include a target state for the training context 110. The target state for the training context 110 may be or include a target state for the training entity 112 and/or a target state for the training environment 114. In some instances, each task or each of a subset of the tasks may also define one or more task-specific failure criteria. These task-specific failure may be failure criteria that can be defined for a particular task, and may be in addition to one or more general failure criteria.

Each task may include one or more parameters. The parameters may define the initial state, and the one or more success criteria for the task. Where present, the parameters may also define one or more task-specific failure criteria for the task. These parameters may include any number of and/or any combination of continuous numeric parameters, discrete numeric parameters, binary parameters, and selection parameters, e.g. a selection from a plurality of options. Numeric parameters may be bounded within an appropriate range. Certain subranges may also be excluded from the possible numeric parameters. The task generator 112 may generate random tasks. For example, each of the task parameters may be generated randomly, e.g. each parameter may be generated according to one or more uniform distributions and/or one or more other suitable probability distributions, such as the Bernoulli or Poisson distribution. For numeric parameters, a random number may be generated. For binary parameters, a random bit or bit string may be generated. For selection parameters, a number, e.g. one or more, of the plurality options may be selected at random. A random number generator (RNG) or pseudorandom number generator (PRNG) may be used to randomly generate the parameters. References herein to 'random' and its derivatives should be understood to include embodiments that are pseudorandom, e.g. generate numbers or other parameters pseudorandomly.

Navigation tasks are an example of a type of task. A navigation task may define the initial state as an initial position for the training entity and may define one or more success criteria including a target position for the training entity 114. Each of the initial position and the target position may be represented using coordinates, e.g. 2D or 3D coordinates. Coordinates for the initial position and the target position may be generated randomly. The randomly generated coordinates may be restricted within a navigable area, e.g. excluding coordinates where obstacles are located and/or being bounded within a given coordinate range corresponding to the boundary of the training environment 114. The target position may indicate a position at which a target object is to be located. The navigation task may additionally include a type of the target object, e.g. a semantic class of the target object. The navigation task may also define one or more task-specific failure criteria. The one or more task-specific failure criteria for a navigation task may include: a collision avoidance criterion, e.g. a criterion that an attempt to perform the task fails if a collision occurs; a maximum movement criterion, e.g. a criterion that an attempt to perform the task fails if the entity moves a maximum amount or more; a maximum energy usage criteria, e.g. a criterion that an attempt to perform the task fails if a maximum amount of energy or more is used by the entity in the attempt; and/or a time limit criterion, e.g. a criterion that an attempt to perform the task fails if a maximum amount of time or more has passed from the start of the attempt to perform the task.

Variants of navigation tasks include multi-stop navigation tasks, collection tasks, delivery tasks, and combined collection and delivery tasks. In multi-stop navigation tasks, the one or more success criteria define that multiple target positions are to be traversed by the training entity for the task to be completed successfully. In collection tasks, the one or more success criteria define that given object(s) is to be collected by the training entity 114 for the task to be completed successfully, e.g. by recognising using a camera or weight sensor, simulations thereof, or simulator state that an object has been picked up by or loaded onto the training entity 114. For collection tasks, the initial state may define the location(s) of the given object(s) to be collected within the training environment. In delivery tasks, the one or more success criteria define that a given object(s) is to be delivered by the training entity 114 for the task to be completed successfully, e.g. by recognising using a camera or weight sensor, simulations thereof, or simulator state that an object has been unloaded by or from the training entity 114. For delivery tasks, the initial state may define the given object(s) loaded onto the training entity 114 at the commencement of the task. Combined collection and delivery tasks involving collection from at least one location and delivery to at least one other location, so include features relating to multi-stop navigation tasks, collection tasks, and delivery tasks.

Assembly tasks are another example of a type of task. An assembly task may define an initial state of the training context 114 as a collection of components to be assembled and the initial locations of these components (e.g. represented using coordinates) within the training environment 112. The defined initial state may also include an initial position of the training entity 112, however, in some embodiments, the position of the training entity may be fixed, e.g. where the training entity 112 is a fixed industrial assembly robot or a simulation thereof. The one or more success criteria may define relative positions for the components on completion of the assembly.

The task obtainer 120 includes a task easiness estimator 124, e.g. a machine-learned model trained to estimate the easiness of tasks. The task easiness estimator 124 scores the task, e.g. the task easiness estimator 124 estimates an easiness of a task based on the task and/or information relating thereto. The task easiness may be defined as or be based on one or more of: a task easiness value, a task difficulty value, a task success probability (e.g. the estimated probability that the task would be successfully completed by the training agent 130), and/or a task failure probability (e.g. the estimated probability that the task could not be successfully completed by the training agent 130).

The task easiness estimator 124 includes a task property determiner 124-1. The task property determiner 124-1 determines one or more task properties based on the parameters of the task and, in some embodiments, training context information, e.g. information retrieved from or receiving from the training context 110 or a component thereof, e.g. the training environment 112 or the training entity 114. The one or more task properties may include any or any combination of, e.g.: one or more geometric properties; the task parameters or functions thereof; and/or one or more properties derived using and/or based on either or both of training entity information and training environment information.

For tasks defining an initial state that includes an initial position, $s_0$, for the training entity and one or more success criteria that include a target position, $s_g$, for the training entity, e.g. navigation tasks, examples of geometric properties that may be determined include: geodesic distance, the shortest path distance from $s_0$ to $s_g$; path complexity, the ratio of Euclidean distance to geodesic distance of $s_0$, $s_g$; sine of turn angle, where the turn angle is the angle between the focal plane normal and the vector from the principal point to $s_g$, e.g. how much the training entity must be turned at the initial position to see the target position; cosine of the turn angle; agent clearance, the distance from the initial position, $s_0$, to the nearest obstacle; goal clearance, the distance from the target position, $s_g$, to the nearest obstacle; agent island, radius of the traversable area at the initial position, $s_0$; and goal island, radius of the traversable area at the target position, $s_g$. Where the training context 110 is a simulated context or a virtual context, these properties may be easily determined using information retrievable and/or receivable from the training context 110. For example, geometric information about the position of obstacles in a virtual training environment or a simulated training environment may be easily obtainable, and, may be used to derive one or more of the described properties. For real environments, e.g. physical environments, information for determining these properties may be obtained using suitable sensing and/or capture devices, e.g. one or more cameras, Lidar devices, proximity sensors, and/or ultrasonic sensors. Alternatively or additionally, such information about the real environment may have been manually inputted based on one or more human observations.

For tasks of the type described, examples of properties that may be derived using and/or based on training entity information and/or training environment information may include: a ratio between and/or a difference between a width of a training entity and a narrowest passage to be traversed to reach the target position, $s_g$, from the initial position, $s_0$; and/or a minimum task completion time which may be calculated based on known properties of the acceleration and/or the maximum speed of the training entity 114 and the shortest path length.

For collection and delivery tasks, examples of properties that may be derived using and/or based on training entity information and/or training environment information may include a difference or ratio between a maximum load of the training entity 114 and the mass of the object(s) to be delivered and/or collected, and/or a difference or ratio between a maximum volumetric capacity of the training entity 114 and the volume of the object(s) to be delivered and/or collected.

For assembly tasks, examples of properties that may be derived using and/or based on training entity information and/or training environment information may include a difference or ratio between a height, width and/or length of the smallest component and the height, width and/or length of one or more manipulation elements of the training entity 114 for handling the smallest component, e.g. robotic hands or pincers; and/or a difference between the current relative positions of the components and the target relative positions of the components.

The task easiness estimator 124 also includes a task easiness estimation function 124-2. The task easiness estimation function 124-2 estimates an easiness of a task based on the one or more task properties. The task easiness estimation function 124-2 may be a function having one or more trainable parameters. For example, the training easiness estimation function 124-12 may be and/or include a neural network having a plurality of updatable parameters, such as neural network weights. However, the training easiness estimation function 124-2 may be and/or include one or more other types of functions having updatable parameters, e.g. a parametrized linear function of or based on the one or more task properties, a parametrized logistic function of or based on the one or more task properties, or a support vector machine.

In some embodiments, the task easiness estimation function 124-2 is and/or includes a feed-forward neural network. The feed-forward neural network may be a fully connected neural network. The feed-forward neural network may have one or more hidden layers of one or more hidden layer sizes, e.g. the number of nodes in each layer, which may be the same or different In an implementation, the feed-forward neural network has two hidden layers, each of which is size 64. The number of hidden layers and/or the size of each hidden layer may be chosen using grid search to minimize loss when training the feed-forward neural network. Further details of the loss and the training of feed-forward neural network are described in relation to the task easiness estimation function.

The task obtainer 120 may include a task easiness range determiner 126. The task easiness range determiner 126 may determine an intermediate easiness range based on easinesses of a plurality of tasks, e.g. random tasks, generated by the task generator 122. The intermediate easiness range may define a range between which tasks are considered to be of intermediate easiness and equivalently of intermediate difficult. Hence, the intermediate easiness range may also be referred to as an intermediate difficulty range. The intermediate easiness range determiner may be determined based on one or more summary statistics, e.g. the mean and/or standard deviation, calculated across the easinesses the plurality of tasks. An example method for determining the intermediate easiness range is described with respect to FIG. 3A.

The task easiness range determiner 126 may additionally or alternatively determine a threshold easiness. The threshold easiness may define an easiness above which tasks are considered to be easy. The threshold easiness may be determined based on one or more summary statistics, e.g. the mean and/or standard deviation. Where an intermediate easiness range is also determined, the easiness threshold value may be determined based on the intermediate easiness range. For example, the task easiness threshold value may be an upper bound of the intermediate easiness range. An example method for determining the threshold easiness is described with respect to FIG. 3B.

The task obtainer 120 may include a task selector 128. The task selector 128 selects one or more tasks from a plurality of generated tasks generated by the task generator 122. The selection of the tasks may be based on the score of the tasks, e.g. the estimated easinesses of each of the plurality of tasks as estimated by the task easiness estimator 124. The task selector 128 may select the tasks in response to the score satisfying a selection criterion, one or more selection criteria, or at least one of one or more selection criteria. The task selector 128 may receive the intermediate easiness range and/or the threshold easiness from the task easiness range determiner 126 for use in selecting the one or more tasks.

The selected one or more tasks may include one or more intermediate easiness tasks. For example, a success criterion may be satisfied if the score indicates that the one or more tasks are of intermediate easiness, such that the one or more intermediate easiness tasks may be one or more tasks having a score, e.g. an easiness, within the intermediate easiness range determined by the task easiness range determiner 126, and/or within a static intermediate easiness range, e.g. where the easiness is a task success probability, the static intermediate easiness may be the range of 0.4 to 0.6. Intermediate easiness tasks, which may also be referred to as goals of intermediate difficult or frontier tasks, are beneficial for use in training of the training agent as intermediate easiness tasks facilitate better and/or more efficient training of the training agent 130, at least because intermediate easiness tasks provide more learning signal for policy improvement than random tasks as they teach the agent to solve new tasks at its current ability. An example method for selecting the one or more intermediate easiness tasks is described with respect to FIG. 3A.

The selected one or more tasks may include one or more easy tasks. For example, the one or more easy tasks may be one or more tasks having an easiness above the threshold easiness determined by the task easiness range determiner 126, and/or above a static threshold easiness, e.g. where the easiness is a task success probability, the static threshold easiness may be 0.6. Easy tasks are beneficial for use in the training of the training agent 130, at least because easy tasks may alleviate catastrophic forgetting by the training agent 130 during training. For example, during training, an agent may forget to perform easier tasks if it is only trained later on tasks of higher difficulty. An example method for selecting the one or more easy tasks is described with respect to FIG. 3B.

The selected one or more tasks may include one or more random tasks, e.g. one or more random tasks of the plurality of tasks. Random tasks are beneficial during training as they may prevent overfitting and/or enable generalization of the training agent by injecting entropy into the training process. An example method for selecting the one or more random tasks is described with respect to FIG. 3C.

The selected one or more tasks may include one type of task, e.g. intermediate easiness tasks, or may include any combination of the specified task types. The selected one or more tasks may include one or more tasks of each of the specified tasks. This may be beneficial as it may allow the benefits of each of the specified task types to be realised in training, e.g. better and/or more efficient training, the alleviation of catastrophic forgetting, and reduced overfitting and/or better generalization. The proportion of each task type in the selected one or more tasks may change throughout training of the training agent 130. Initially and early in the training, easy and intermediate easiness task may form the majority of the selected one or more tasks. Later in training, random tasks may form the majority of the tasks as the training agent 130 learns to generalize.

The training agent 130 is an agent that is capable of receiving observations of the training environment 112 and/or state of the training entity 114 and attempting performance of one or more tasks, e.g. the selected one or more tasks, by causing actions to be performed by the training entity 114 in the training environment 114. The training agent 130 may be a reinforcement learning agent, e.g. a deep reinforcement learning agent. The training agent may perform actions in accordance with a policy, π, which defines the actions taken by the agent in response to observations. By attempting the performance of tasks, the training agent is trained to better perform the tasks. Embodiments of the training agent 130 and examples of how it may be trained are described with respect to the later figures.

For each task which is attempted to be performed by the training agent 130, the training agent 130 provides a success criteria satisfaction indication to the task easiness estimation function trainer 140. The success criteria satisfaction indication may be a binary indicator indicating whether the task was performed successfully or not. Successful completion of task may be represented as 1. Failure of the task may be represented as 0. The success criteria satisfaction indication may indicate whether the one or more success criteria or at least one thereof was satisfied in attempting to perform the task, prior to the attempt of the task being terminated because a task-specific failure criterion or a general failure criterion was determined to be satisfied. Example of success criteria and task-specific failure criterion are described above in relation to the task generator 122. General failure criterion may be of any of the same types as described for the task-specific failure criterion. An example of a general failure criterion is a timestep limit, e.g. a failure criterion that is satisfied when a maximum number of timesteps is reached, where a timestep is an instances at which an action could be caused to be performed even if no action is caused to be performed at this instance.

The task easiness function trainer 140 trains the task easiness estimation function 124-2 such that it can more accurately estimate the easiness of tasks. The task easiness function trainer 140 includes a loss function calculator 142 and a parameter updater 144. The task easiness function trainer 140 may be trained in conjunction with the training agent 130 such that the task easiness estimation function 124-2 estimates The loss function calculator 142 calculates a loss based on a difference between the actual easiness of the task and the expected easiness of the task estimated by the easiness estimation function. The actual easiness of the task may be determined based on the success criteria satisfaction indication. Tasks that have been successfully completed may be determined to have a high easiness, while tasks that have not been successfully completed may be considered to have a low easiness. Where the easiness is defined as the success probability, the success criteria satisfaction indication, where success is represented as 1 and failure as 0, may itself be the actual easiness of the task, as a task that has been completed successfully has a success probability of 1, while one that has failed has a success probability of 0. The loss function calculator may calculate the loss using any suitable loss function, e.g. cross-entropy loss, hinge loss, or the Kullbeck-Leibler divergence.

The parameter updater 144 may update the parameters of the task easiness estimation function 124-2 as to minimize or at least reduce the loss. Where the task easiness estimation function 124-2 is or includes a neural network, the parameters, e.g. weights, of the neural network may be updated using backpropagation. The amount of the parameter update may be based on a learning rate. The learning rate may be chosen to minimize loss using grid search. In an implementation, the learning rate is 0.1.

Agent and Task Easiness Estimation Function Training Method

Figure 2:
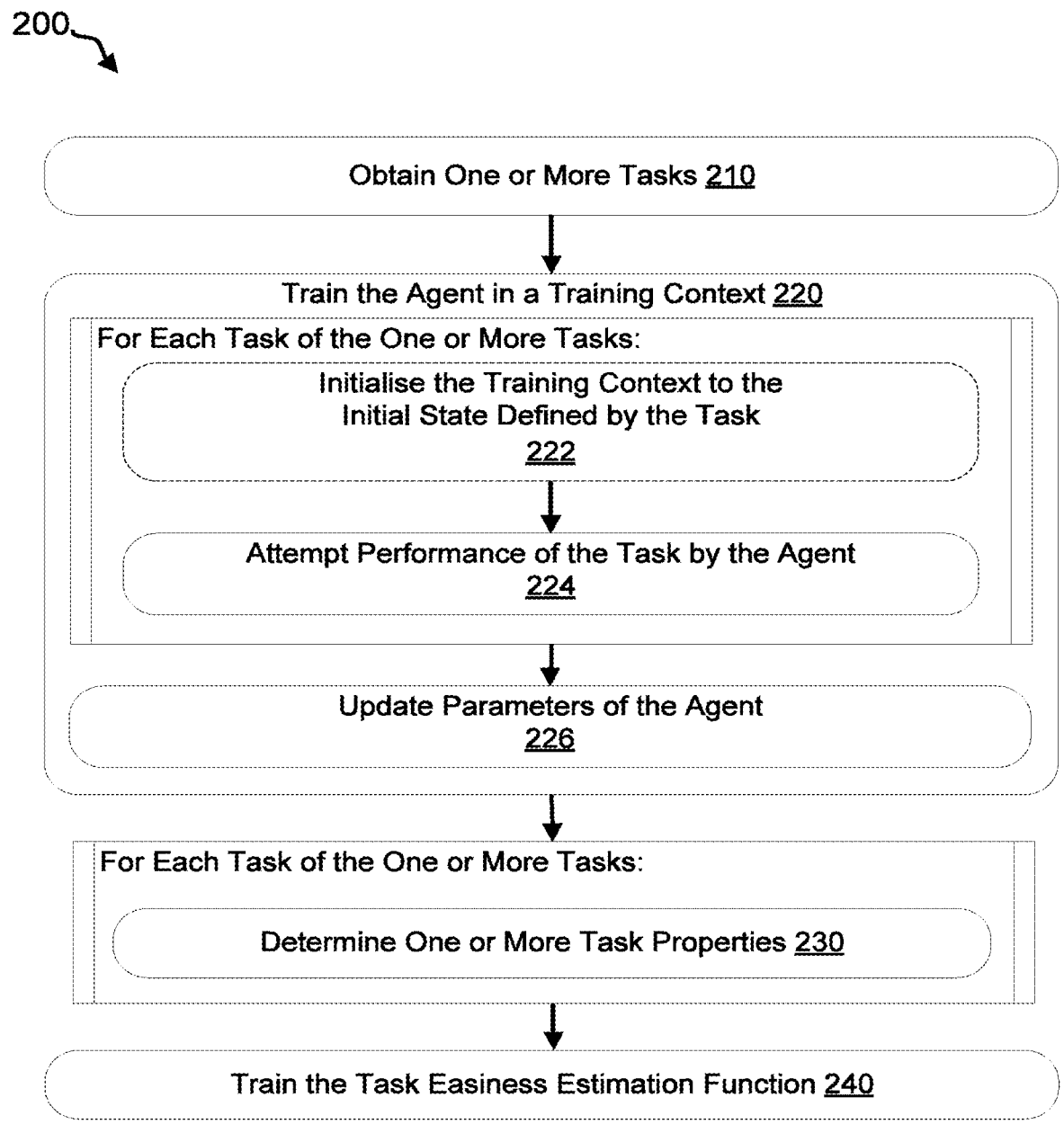
FIG. 2 is a flow diagram of a method for training an agent and a task easiness function in accordance with example embodiments.

FIG. 2 illustrates an example method for training an agent and for training a task easiness estimation function. The agent may be the training agent 502B described with respect to FIG. 5B and/or the training agent 130 described with respect to FIG. 1. The example method may be implemented as one or more computer-executable instructions executed one or more computing devices, e.g. the computing device 700 described in relation to FIG. 7. The example method may be performed using the system 100, or part thereof. Optional steps are indicated by dashed lines.

In step 210, one or more tasks are obtained. Each task of the one or more tasks defines an each an initial state and one or more success criteria. Examples of tasks and how the one or more tasks are described with respect to the task obtainer 110 of FIG. 1. Examples of how the one or more tasks may be obtained are described with respect to the methods 210-A, 210-B, and 210-C of FIG. 2A-2C, respectively.

In step 220, the agent is trained in a training context. For example, the agent may be trained using a reinforcement learning method. A reinforcement learning method may be defined as a method where an agent is trained with the goal of maximizing a cumulative reward obtained by the actions selected by the agent, e.g. a reinforcement learning method may be a method whereby certain actions are reinforced, e.g. chosen to be performed more frequently in the given state, based on the reward received. The agent may be trained by the agent trainer 530 described in relation to FIG. 5B, and examples of how the agent may be trained are included in relation to this. For example, the agent may be trained using a variant of proximal policy optimization (PPO), e.g. PPO with clipping. Examples of the training context are described with respect to the training context 110 of to FIG. 1.

The step 220 may include initialisation step(s) 222 and task performance attempt step(s) 224, which are performed for each of the one or more tasks. The step 220 may also include a parameter agent update step 222.

In the initialisation step(s) 222, the training context is initialized to an initial state defined by the task. Examples of initial states which may be defined by the task are described with respect the task generator 122.

In the task performance attempt step(s) 224, performance of the task is attempted by the agent. An example embodiment of the task performance attempt step 224 is described with respect to FIG. 4. Examples of how performance of task may be attempted are also described in relation to the training agent 130 of FIG. 1.

In step 226, the parameters of the agent are updated based on the attempted performances of each task by the agent. The parameters of the agent may be updated using any suitable method. For example, where the agent is a deep reinforcement learning agent including one or more neural networks, the parameters of at least one of the one or more of the neural networks may be updated using backpropagation. The updating of the parameters may be based on a reward calculated using a reward function and/or an advantage calculated using an advantage function. Examples of how the parameters may be updated are described with respect to the agent trainer 530 of FIG. 5B.

In step 230, one or more task properties are determined for each task of the one or more tasks. Examples of one or more task properties and how they may be determined are described with respect to the task property determiner of 124-1 of FIG. 1.

In step 240, the task easiness estimation function 240 is trained. Training the task easiness estimation function may be based on a training set comprising, for each task of the one or more tasks, the one or more properties of the task and an indication of whether attempting performance of the task resulted in at least one of the one or more success criteria being satisfied. Training the task easiness estimation function may include calculating one or more losses, based on the training set, using a loss function and updating the parameters of the task easiness estimation function based on the one or more losses. Examples of how the one or more losses may be calculated are described with respect to the loss function calculator 142 of FIG. 1. Examples of how parameters may be updated are described in relation to the parameter updater 144 of FIG. 1.

Task Obtainment Methods

Figure 3A:
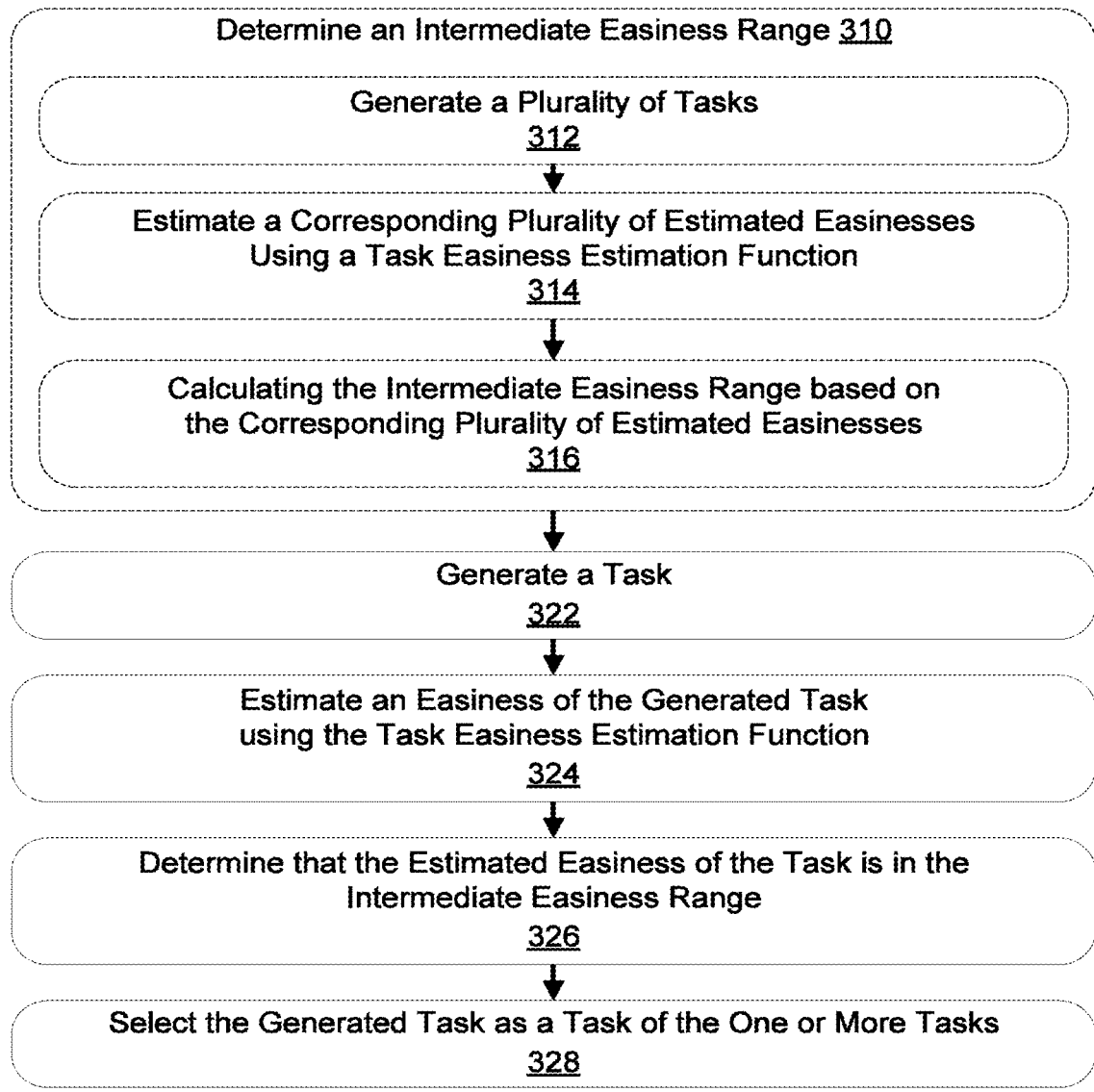
FIG. 3A is a flow diagram of a first method used for obtaining one or more tasks in accordance with example embodiments.
Figure 3B:
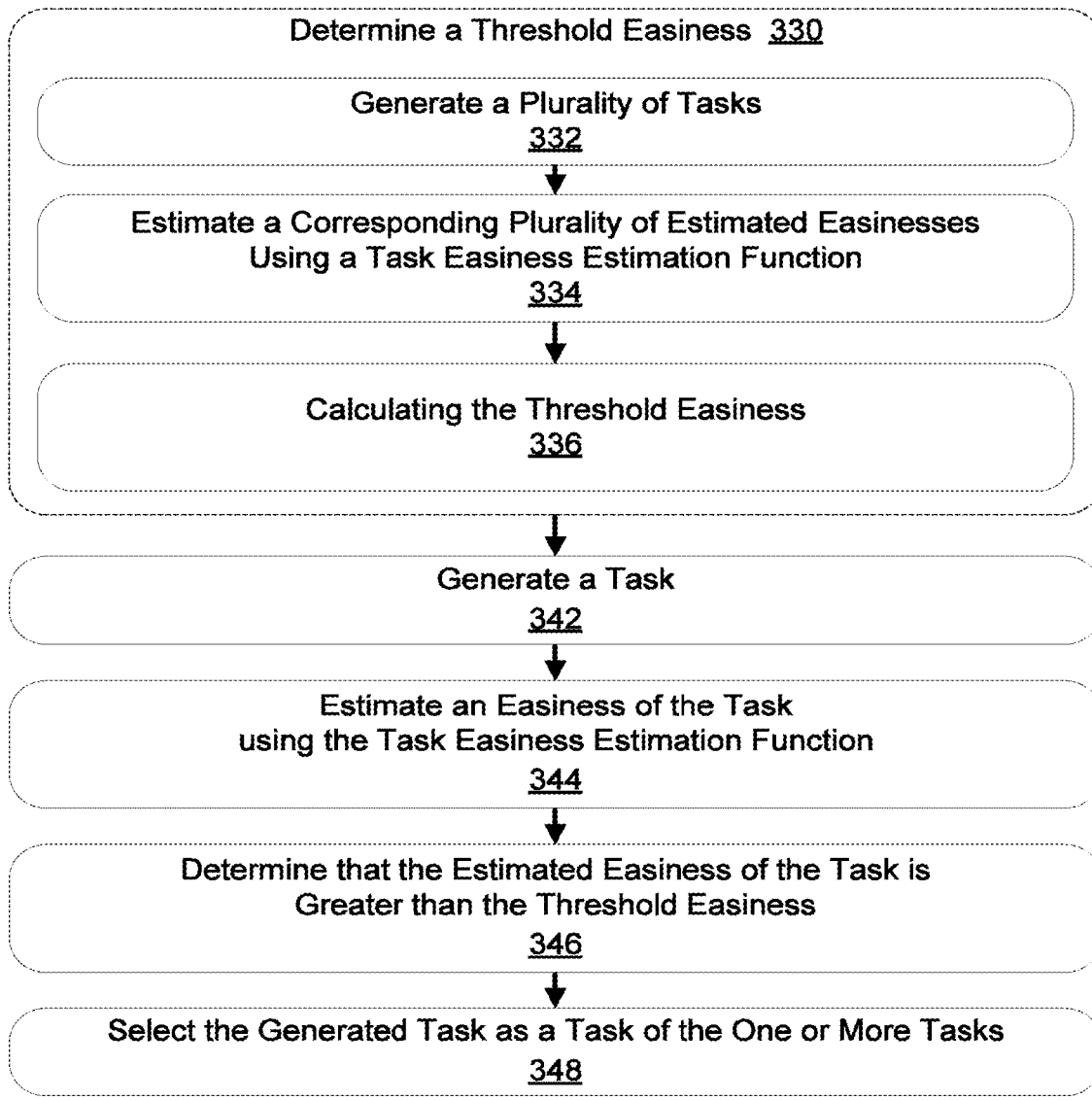
FIG. 3B is a flow diagram of a second method used for obtaining one or more tasks in accordance with example embodiments.
Figure 3C:
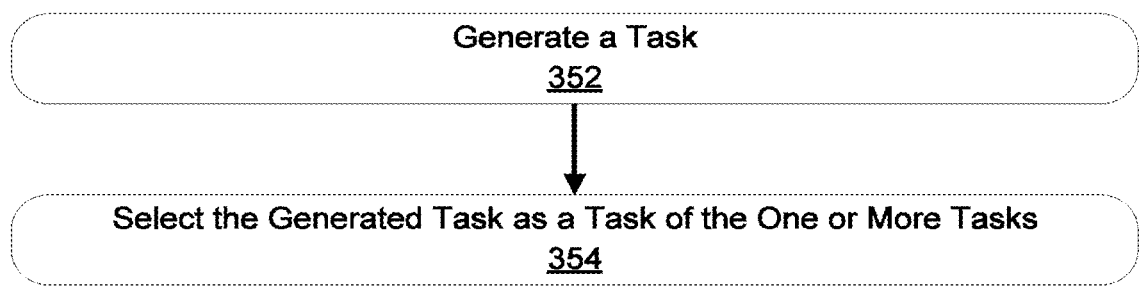
FIG. 3C is a flow diagram of a third method used for obtaining one or more tasks in accordance with example embodiments.

FIGS. 3A-3C describe example methods used in obtaining the one or more tasks.

Method 210A is a method for selecting a task of an intermediate easiness. Optional steps are indicated by dashed lines.

In step 310, an intermediate easiness range is determined. The intermediate easiness range may also be referred to as an intermediate difficult range. The intermediate easiness range determination may include a generation step 312, an estimation step 314, and a calculation step 314. It should be noted that, in some embodiments, the intermediate easiness range may be static, e.g. 0.4 to 0.6 where the easiness is a success probability or otherwise determined using a different method than the one described.

In step 312, a plurality of tasks are generated. The plurality of tasks may be random or pseudorandom tasks. Examples of how the plurality of tasks may be generated are described in relation to the task generator 122 and the task easiness range determiner 126 of FIG. 1.

In step 314, a corresponding plurality of estimated easinesses for the plurality of tasks are estimated using a task easiness estimation function, e.g. a machine-learned model. Estimating the easiness for the plurality of tasks may be referred to as or be an instance of scoring the plurality of tasks. The easiness estimation function may be referred to as $f_\pi$, hence the estimated easiness for a given task, h may be referred to as $f_\pi(h)$. Where the estimated easiness is the task success probability, the difficulty of the task may be defined as the complement of the estimated easiness, $1-f_\pi(h)$. Examples of how task easiness may be estimated are described in relation to the task easiness estimator of FIG. 1. Examples of task easiness estimation functions are described in relation to the task easiness estimation function 124-2 of FIG. 1.

In step 316, the intermediate easiness range is calculated based on the corresponding plurality of estimated easinesses. Determining an intermediate easiness range is or may be an instance of determining a range, e.g. a range of scores. The intermediate easiness range may be calculated based on summary statistics of the corresponding plurality of variables. For example, the intermediate easiness range may be determined based on the mean of the estimated easinesses, $pf$, and the standard deviation of the estimated easinesses, $\sigma_f$. The intermediate easiness range may be $\mu_f - \gamma \sigma_f$ to $\mu_f + \gamma \sigma_f$, where $\gamma$ is a hyperparameter. Further details of how the intermediate easiness range may be determined are described in relation to the task easiness range determiner 126 of FIG. 1.

In step 322, a task is generated. The generated task may be a random task. Examples of how the task may be generated are described in relation to the task generator 122 of FIG. 1.

In step 324, the easiness of the generated task is estimated using the task easiness estimation function. The easiness of the task may be estimated in any of the ways described in relation to step 314.

In step 326, it is determined that the estimated easiness of the task is within the intermediate easiness range. The estimated easiness being within the intermediate easiness range is an example of a selection criterion. In some embodiments, the intermediate easiness range may be an exclusive range while, in other embodiments, the intermediate easiness range may be an inclusive range. For the example of the intermediate easiness range previously given, if the range is an exclusive range, determining that the estimated easiness is in the intermediate easiness range can be denoted as $$\mu_f - \gamma \sigma_f < f_\pi(h) < \mu_f - \gamma \sigma_f$$

, while, if the range is an inclusive range, determining that the estimated easiness is in the intermediate easiness range can be denoted as:

$$\mu_f - \gamma \sigma_f \leq f_\pi(h) \leq \mu_f - \gamma \sigma_f$$

Further details are described in relation to the task selector 128 of FIG. 1.

In step 328, the generated task is selected as a task of the one or more tasks. Further details are described in relation to the task selector 128 of FIG. 1.

Method 210B is a method for selecting an easy task. Optional steps are indicated by dashed lines.

In step 330, a threshold easiness is determined. The determination of the threshold easiness may be or may be an instance of determining a threshold score. The threshold easiness determination may include a generation step 332, an estimation step 334, and a calculation step 334. It should be noted that, in some embodiments, the threshold easiness may be static, e.g. 0.8 where the easiness is a success probability, or otherwise determined using a different method than the one described.

In step 332, a plurality of tasks are generated. The plurality of tasks may be random or pseudorandom tasks. Examples of how the plurality of tasks may be generated are described in relation to the task generator 122 and the task easiness range determiner 126 of FIG. 1.

In step 334, a corresponding plurality of estimated easinesses for the plurality of tasks are estimated using a task easiness estimation function. The corresponding plurality of estimated easinesses for the plurality of tasks may be estimated in any of the ways described in relation to step 314.

In step 336, the threshold easiness is calculated based on the corresponding plurality of estimated easinesses. The threshold easiness may be calculated based on summary statistics of the corresponding plurality of estimated easinesses. For example, the threshold easiness may be determined based on the mean estimated easiness, $\mu_f$, and the standard deviation of the estimated easinesses, $\sigma_f$. The threshold easiness may be $\mu_f + \beta\sigma_f$, where $\beta$ is a hyperparameter. Further details of how the threshold easiness may be determined are described in relation to the task easiness range determiner 126 of FIG. 1.

In step 342, a task is generated. The generated task may be a random task. Examples of how the task may be generated are described in relation to the task generator 122 of FIG. 1.

In step 344, the easiness of the generated task is estimated using the task easiness estimation function. The easiness of the task may be estimated in any of the ways described in relation to step 314.

In step 346, it is determined that the estimated easiness of the task is greater than the threshold easiness. The estimated easiness being greater than the threshold easiness is an example of a selection criterion. For the example of the threshold easiness previously given, determining that the estimated easiness is greater than the threshold easiness can be denoted as $f_\pi(h) > \mu_f + \beta\sigma_f$. Further details are described in relation to the task selector 128 of FIG. 1.

In step 348, the generated task is selected as a task of the one or more tasks. Further details are described in relation to the task selector 128 of FIG. 1.

Method 210C is a method for selecting an arbitrary task, e.g. a random task.

In step 352, a task is generated. The generated task may be a random task. Examples of how the task may be generated are described in relation to the task generator 122 of FIG. 1.

In step 354, the task is selected as a task of the one or more tasks. For example, where the generated tasks is a random task, a random task is selected as a task of the one or more tasks. Further details are described in relation to the task selector 128 of FIG. 1.

Further details of how these methods may be combined to implement the step 210 of obtaining the one or more tasks are described with respect to the task obtainer 120 of FIG. 1 and the components thereof.

Embodiments where obtaining the one or more tasks includes the step 310 of determining the intermediate easiness range and/or the step 330 of determining the threshold easiness may be referred to as employing 'adaptive filtering'.

Included below is an example of the algorithm showing an example implementation whereby the one or more tasks may be obtained.

---

Algorithm 1: Training loop with $f_\pi$ update input :∅
output :π
π, $f_\pi$, $\mu_f$, $\sigma_f$ ← Init( );
for i ← 0 to numEpochs do
   tasks, successes, states, actions, rewards ←
     Rollouts(π, $f_\pi$, $\mu_f$, $\sigma_f$);
   π ← PPO(π, states, actions, rewards);
   $f_\pi$ ← Train($f_\pi$, tasks, successes);
   randomTasks ← GetRandomTasks( );
   $\mu_f$, $\sigma_f$ ← FitNormal($f_\pi$, randomTasks);
return π;

---

Algorithm 2: Rollouts input :π, $f_\pi$, $\mu_f$, $\sigma_f$;
output :rollouts
for i ← 0 to batchSize do
   task ← GetDynamicTask($f_\pi$, $\mu_f$, $\sigma_f$);
   rollouts[i] ← RunEpisode(π, task);

return rollouts;

---

Algorithm 3: GetDynamicTask input :Timestep t; $f_\pi$; $\mu_f$, $\sigma_f$;
   Hyperparameters β, γ
output :Task h
taskType ← GetTaskType (t);
while true do
   h ← RandomTask( ) ;
   switch taskType do
     case easy do
        if $f_\pi(h) > \mu_f + \beta\sigma_f$ then
           return h;
     case frontier do
        if $\mu_f - \gamma\sigma_f < f_\pi(h) < \mu_f + \gamma\sigma_f$ then
           return h;
     case random do
        return h;

---

Task Performance Method

Figure 4:
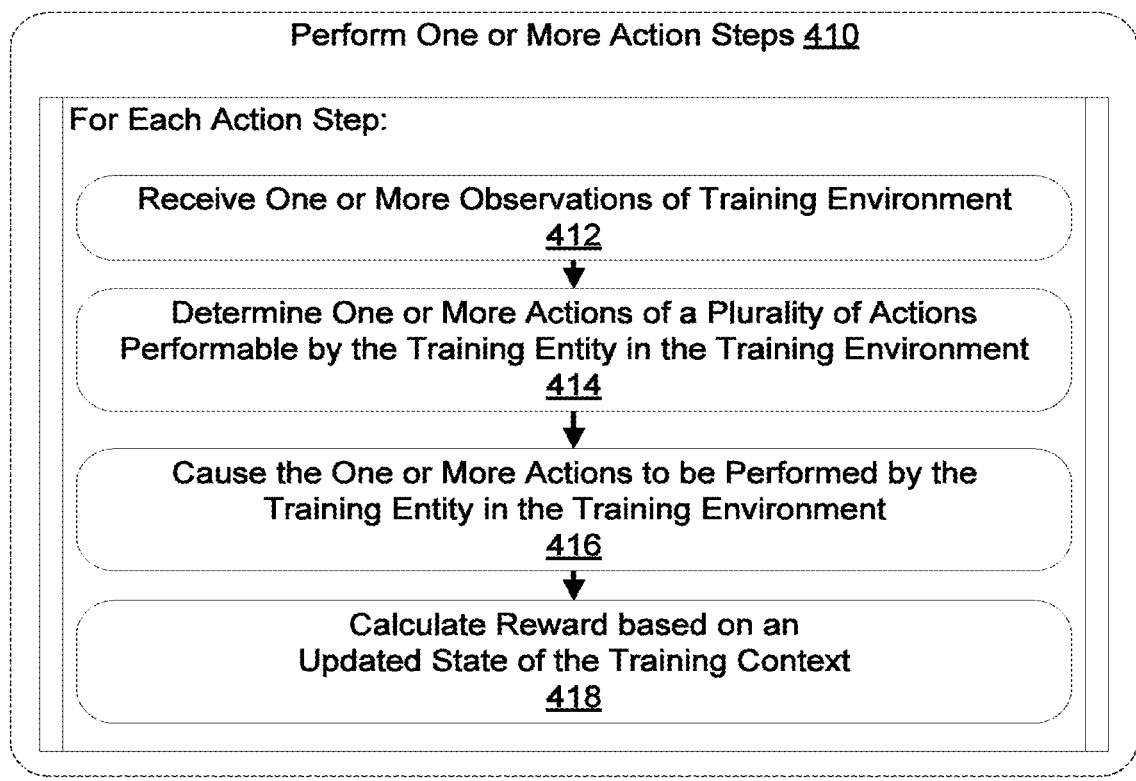
FIG. 4 is a flow diagram of a method for attempting performance of a task by an agent in accordance with example embodiments.

FIG. 4 is a flow diagram of a method 224 for attempting performance of a task by an agent in accordance with example embodiments.

In step 410, one or more action steps are performed. For each action step of the one or more actions steps, an observation receiving step 412, an action determination step 414, an action causation step 416, and a reward calculation step 418. Action steps are performed until a success criterion or a failure criterion is satisfied.

In step 412, one or more observations of the training environment are received. If the training environment is a physical environment, the one or more observations of the training environment may be any suitable observation that can be captured of the training environment. For example, the observation may be one or more of one or more images. The one or more images may be passive images and/or active images. The images may be 2D images, and/or 3D images including depth maps. Passive images may be images based on waves present in the environment without special intervention, e.g. without output from the entity or a component thereof. For example, passive images may be images based on electromagnetic waves present in the environment without special intervention, e.g. visible light, infrared light, and/or ultraviolet light. These electromagnetic waves may be captured by one or more cameras, e.g. a visible light (or normal) camera, an infrared camera or an ultraviolet camera. Active images may be images based on waves emitted for the purposes of imaging and reflections thereof, e.g. waves outputted by the entity or a component thereof. For example, active images may be based on electromagnetic waves and reflections thereof outputted by a component of the entity, e.g. radio waves emitted using a radar device, laser light emitted using a Lidar device, X-rays emitted by an X-ray device, or microwaves emitted using a microwave imaging device. Active images may be based on soundwaves outputted by the entity, e.g. ultrasonic soundwaves emitted by an ultrasound imaging device. The observation may also be or include one or more sensor observations, e.g. one or more heat sensor observations from one or more heat sensors on the training entity; or one or more sound observations captured by one or more microphones on a training entity. If the training environment is a simulated environment, the observations may be a simulation of any of the above, e.g. one or more renderings of the environment corresponding to images that would be captured by one or more simulated cameras of the training entity in the simulated environment. The renderings of the environment may be substantially photorealistic. Using substantially photorealistic renderings may facilitate training of an agent in a simulated environment. More generally, using substantially realistic simulations of real observations that would be captured by an entity in a real environment may facilitate training an entity in a simulated environment that could be utilized in a physical environment.

In an example, the observation may be one or more renderings corresponding to one or more images that would be captured by a single camera of a simulated entity in the simulated environment. By using renderings corresponding to one or more images that corresponding to one or more images that would be captured by a simulated entity in a simulated environment may facilitate training of an entity that, when deployed in a physical environment, would not require multiple cameras and/or multimodal input in order to be utilized in a physical environment.

If the training environment is a video game environment, the observations may correspond to what would be seen by a player of the video game, e.g. a screen and/or output of the video game or environment state that is also provided to the player. This may facilitate training of an agent that provides more human-like behaviour as the agent is basing the performed actions on the same information as the player. One or more indications of a state of the training entity In step 414, one or more actions of a plurality of actions performable by the training entity in training environment are determined.

The plurality of actions performable by the training entity in the training environment may include one or more movement actions, e.g. moving forward, moving backwards, turning left, and/or turning right. In an implementation, the agent's actions may be discrete, position-based motion primitives (i.e. move forward, turn left or right), without explicit loop closure outside of said primitives. The plurality of actions performable by the training entity in the training environment may comprise one or more manipulation actions, e.g. movement or actuation of one or more manipulation components, such as a robotic hand or pincer. The plurality of actions performable may include one or more appliance actions performable by the training entity in the training environment, e.g. actuating a vacuuming component.

The one or more of the plurality of actions may be determined by calculating an action probability indicating the probability each of the plurality of actions is the optimal action using a function of the agent, e.g. one or more neural networks of the agent, where at least part of the function is trainable, e.g. at least one of the one or more neural networks of the agents. The one or more actions may be determined, e.g. selected, as the one or more actions that have the highest probability of having a highest reward.

However, when determining the one or more actions, at least during training, there may be a degree of entropy in determining the one or more actions. This may encourage exploration. For example, the one or more actions may be determined by selecting one or more actions of the plurality of performable actions at random according to a probability distribution based on the probabilities of the actions being optimal. To encourage exploration, the probability of performing actions that have been determined to have a low probability of having a highest reward may be increased.

In step 416, the one or more actions are caused to be performed by the training entity in the training environment. The one or more actions to be performed using a control interface which receives an indication of the action to be performed by the agent then controls the agent to perform the indicated action. Using a control interface may facilitate the same or a similar agent being trained and/or used in a simulated environment and a real environment as the actions indicated by the agent can be abstracted from their control implementation.

In step 418, a reward is calculated based on an updated state of the training context, e.g. based on an updated state of the training entity and/or an updated state of the training environment. The calculated reward may be increased in response to at least one of the one or more success criteria being satisfied. The calculated reward may be increased in response to the updated state of the training context including an updated state of the training entity that is different from previous states, e.g. an updated position that is different from previous positions, of the training entity, which may be facilitated by keeping a buffer of the previous states, e.g. the previous positions of the training entity. Increasing the calculated reward in response to the update state being different from previous states encourages exploration and may prevent the training agent being caught in a local minima during training. For tasks, such as navigation tasks, where the training entity or a component thereof performs movement actions, the calculated reward may also be increased in response to the distance travelled. This may also encourage exploration and prevent the agent remaining and/or spinning before it has achieved at least one of the one or more success criteria. The calculated reward may be decreased in response to the training entity colliding with one or more objects in the training environment. This encourages the training agent to avoid collisions.

An example of a reward function by which the reward may be calculated for navigation tasks is:

$$r(s) = \mathbb{1}_{succ} + \delta(-\mathbb{1}_{coll} + \mathbb{1}_{expl}) + 0.01d$$

where s is the updated state. The binary indicator $\mathbb{1}_{succ}$ is true on upon satisfying at least one of one or more success criteria, e g reaching a target position, and false otherwise. $\mathbb{1}_{coll}$ is true upon collision and false otherwise. The hyperparameter $0<\delta<1$ controls the agent's affinity for learning exploration and motor skills compared to target-seeking behaviour. $\mathbb{1}_{expl}$ is an intrinsic reward for exploration, which may be determined by keeping a buffer of past agent positions over a task performance attempt, and provide a reward if the current position of the agent is some distance from all previous positions. The intrinsic reward for exploration may prevent the agent falling into a local maxima of spinning in place to avoid the negative reward from collisions. d is the distance travelled in the current step, expressing the prior that the agent should be trying to cover as large a search area as possible.

In at least embodiments, where a method according to the above is used to attempt performance of the task by the agent, updating the parameters of the agent based on the attempted performance of each task, e.g. step 226 of method 200, may include updating the parameters of the agent, based on a training set comprising, for each action step of the one or more action steps for each task of the one or more tasks, a representation of the state of the training entity at the beginning of the action step, the selected one or more actions, and the calculated reward.

Agent in Production Environment

Figure 5A:
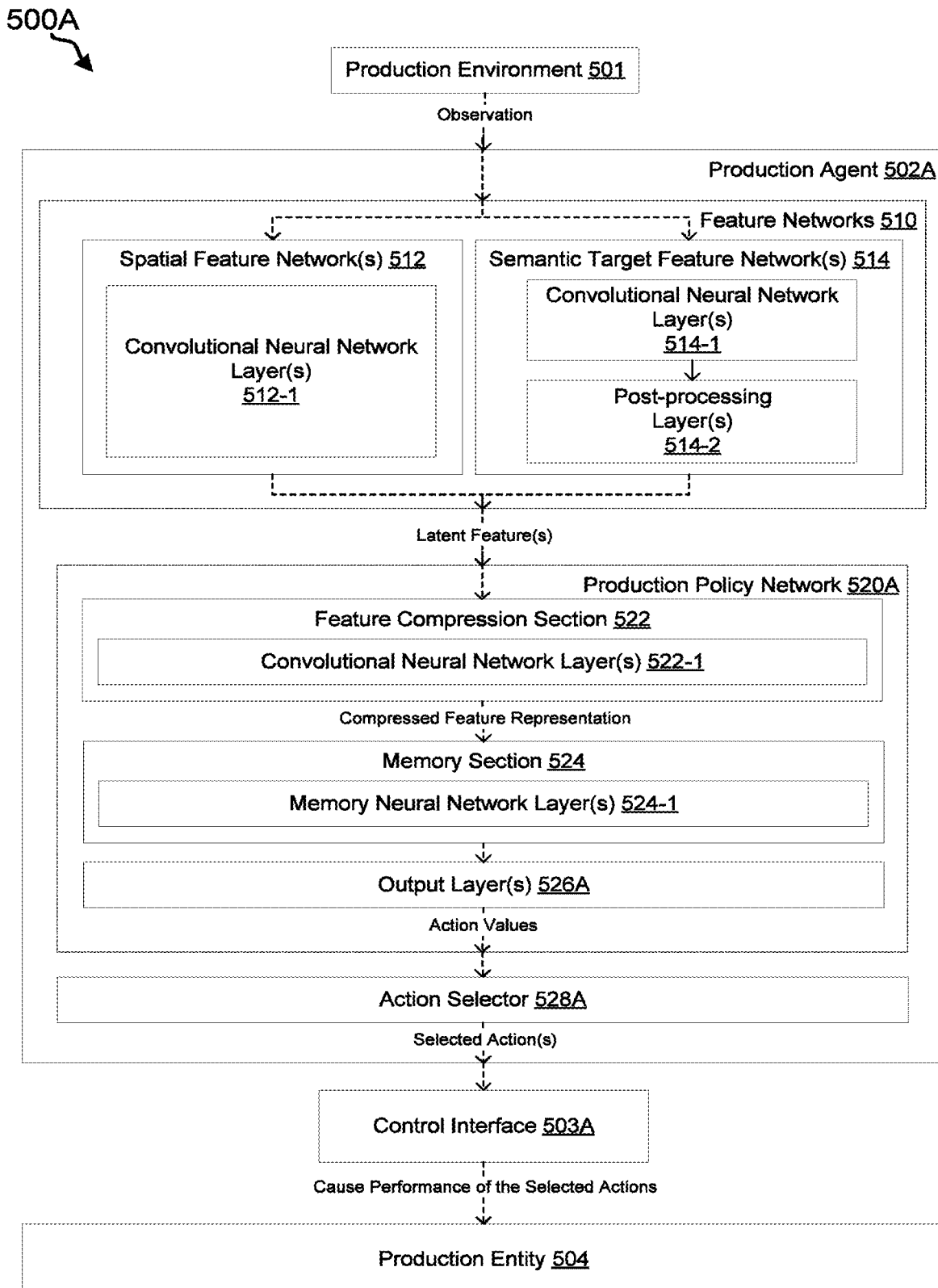
FIG. 5A is a schematic diagram illustrating an agent in use in a production environment in accordance with example embodiments.
Figure 5B:
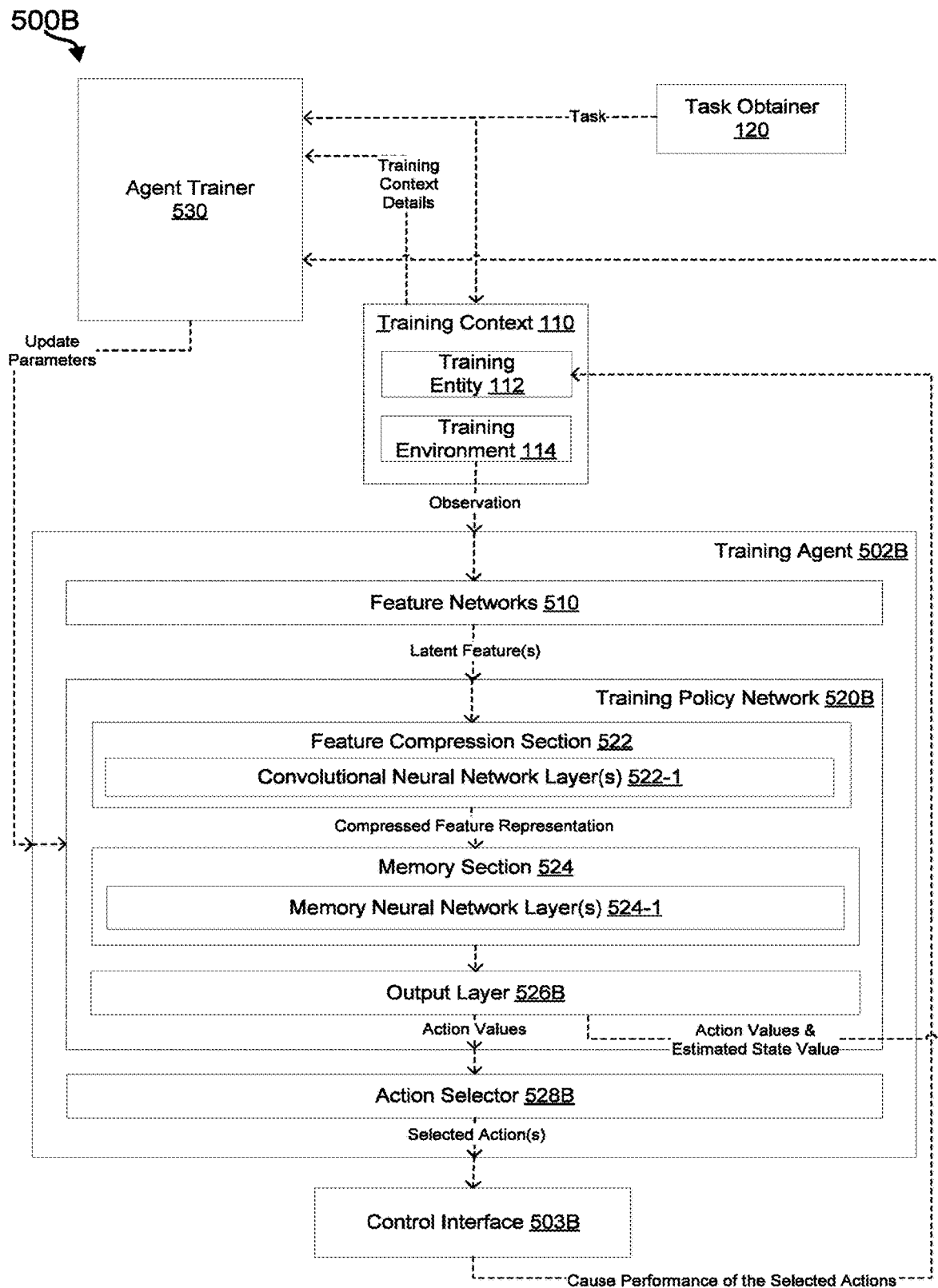
FIG. 5B is a schematic diagram illustrating an agent in training in accordance with example embodiments.

FIG. 5A is a schematic diagram 500A illustrating a production agent 502A in use in a production environment 501 to control, using a control interface 503A, a production entity 504, in accordance with example embodiments.

The production environment 501 refers to an environment where the training agent 502A is being used as opposed to one where it is trained. The production environment 501 may be any suitable environment, e.g. any of the environments described in relation to the training environment 112 of the FIG. 1. In some embodiments, the production environment is a real environment, e.g. one of the physical environments described with respect to the training environment 112 of FIG. 1. In the context of video game environments, the production environment may be an in-play video game environment, e.g. a video game environment that is being played rather than one in which training is occurring.

One or more observations of the production environment 501 may be received by the production agent 502A, e.g. one or more active or passive images. In an example, the observations may be one or more images captured by a single camera of the production entity 504. A suitably trained production agent 502A may be capable of controlling the production entity 504A based on a single camera input, and may not require multiple cameras and/or multimodal input in order to perform the specified task. Other examples of observations that may be received are described with respect to the step 412 of FIG. 4.

The production 502A refers to an the agent is being used as opposed to one where it is trained The production agent 502A is an agent configured to cause one or more actions to be performed based on the one or more observations as will be described.

The production agent 502A may include one or more features networks 510 and a production policy network 520A.

The one or more feature networks 510 process the observation to obtain one or more latent features. The parameters of the one or more feature networks 510 may have been frozen during training to prevent overfitting to the training environment, e.g. to a simulation. The obtained one or more latent features may be spatially-coherent latent features. The obtained one or more latent features may be stacked and provided to the policy network 520.

The one or more feature networks 510 may include one or more spatial feature networks 512. The one or more spatial feature networks 512 may process the one or more observations to obtain one or more spatial features from the observations, e.g. spatial features of the environment. The one or more spatial feature networks may include one or more convolutional neural network layers 512-1.

Where the one or more observations include images, the one or more spatial feature networks may be or include at least the encoders of one or more spatial autoencoders pretrained on real images, such as images of a physical environment, e.g. trained prior to the training of the agent 502. For spatial feature networks for other types of observations, the one or more spatial feature networks may be or include at least the encoders of one or more spatial autoencoders pretrained on real observations of the given type. Using spatial feature networks pretrained using one or more real images and/or other real observations may facilitate the functioning of an agent, which has been trained using a simulated environment and/or simulated entity, with a real entity in a real environment.

The one or more feature networks may include one or more semantic target feature networks 514. The one or more semantic target feature networks may process the one or more observations to obtain one or more semantic target features.

The semantic target feature may indicate an area of the one or more observations where a semantic target, e.g. an object of a given object class, is located. Examples of object classes may include household object classes, e.g. a ball, a fan, a vase, a cupboard, or a desk; room type object classes, e.g. bathroom, bedroom, study, private office, or stationery cupboard; office object classes, e.g. photocopier, video conferencing equipment, or filing cupboard; industrial object classes, e.g. machinery of a given type, or an assembly line, or a position thereon; and/or medical object classes, e.g. pharmaceutical or medical devices of a given type.

The one or more semantic target feature networks 514 may include one or more convolution neural network layers 514-1. Given an observation, e.g. an image, the convolutional neural network layers 514-1 may predict a binary mask M for each object class of a plurality of object classes. The one or more convolutional neural network layers 514-1 may also give a prediction confidence for each object class of the plurality of objects The one or more convolutional neural network layers 522-1 may be pretrained on a dataset including depictions, such as images of a physical environment, of common objects in context, e.g. the COCO dataset. The one or more convolutional neural network layers 522-1 may be or include a Mask-R-CNN. The Mask-R-CNN may have an FPN network backbone.

The one or more semantic target feature networks 514 may include one or more post-processing layers 514-2. The one or more post-processing layers 514-2 may be configured to extract a binary mask for an object class of the one or more object classes, wherein the object class is based on a settable label, l. Using a settable label to specify the object class facilitates searching for different object classes at runtime by setting the label. The settable label may be set to object classes for which objects of that object class were not included in the tasks performed during training, e.g. objects of the given class were not a target of a navigation task to such an object. For example, the training tasks may have been performed with navigation tasks to ball objects and the settable label may be set to vase objects.

In an implementation, the one or more post-processing layers 514-2 may perform scalar multiplication of the extracted binary mask for an object class for a given label l with the prediction confidence to get an output O:

$$O(x,y)=P(M(x,y)_{label=l}).$$

Pixels of O still contain shape information on the target object (e.g. a ball mask will be round but a box mask will be square). To prevent the policy network 520 from overfitting to a specific object shape during training of the agent 502, as well as to reduce the size of the one or more semantic target features, a max-pool operation may be applied to O. The result of the application of the max-pool application to O may be the one or more semantic target features.

Alternatively or in addition to determining where an object of a given object class is located, the one or more semantic target feature networks 514 may determine locations associated with a desired target for performing another task, e.g. a task defined at a higher-level of abstraction, and/or which is to be performed in addition to navigation. For example, the another task may be receiving energy using a solar panel of the entity, and the semantic target feature network may identify target locations of the image where the amount of energy to be received is approximated to be greatest. As another example, the another task may be locating objects of forensic importance in a crime scene, and the semantic target feature network may identify target objects which are approximated to provide the most information without a particular type or class of target objects being specified. The semantic target feature networks of these examples may include one or more convolutional neural network layers for identifying the target locations in the image where these semantic targets are located and/or may include one or more post-processing layers for specifying different variations of the desired target at runtime. In some examples, the (pre)training of these alternative or additional one or more semantic target feature networks may include training these semantic target feature networks using a reinforcement learning method with a reward. This reward may be different from the calculated reward for navigation described previously and may be a reward adapted for training the semantic target feature network for the performance of the another task.

The production policy network 520A may process the one or more latent features to determine one or more action values, e.g. estimated probabilities that each of the one or more actions are the optimal action to take.

The production policy network 520A may include a feature compression section 522 to compress the one or more latent features into a compressed feature representation. The feature-compression section 522 may include one or more convolutional neural network layers 522-1. The one or more convolutional neural network layers 522-1 may be used to compress the one or more latent features, e.g. where the one or more latent features are spatially-coherent latent features. The one or more convolutional neural network layers 522-1 may be a three-layer convolutional neural network which takes as input 1×(8n+1)×16×16 matrices where n is the number of spatial features, and compresses them using the three convolutional layers with ReLU activation. For example, the three convolutional layers may be as specified in the below table. In this example, the output, which is the compressed feature representation, is a vector with length 256.

| Layer | Num. Filters | Kernel Size | Stride |
|-------|--------------|-------------|--------|
| 1 | 32 | 4 | 2 |
| 2 | 64 | 4 | 2 |
| 3 | 128 | 2 | 1 |

The production policy network 520A may include a memory section 524. The memory section 524 receives and processes the compressed feature representation to obtain a memory section output. The memory section 524 facilitates maintaining, e.g. storing, state information, which may be used to keep tasks performed by the agent Markovian. For example, to keep navigation tasks Markovian, the state must contain information on where the agent has been, and if it has previously seen the target. The memory section may include one or more memory neural networks layers 524-1. Cells of the one or more memory neural network layers 524-1 cells may represent state in a partially-observable Markov decision process (POMDP). The one or more memory neural network layers 524 may be or include one or more long short-term memory (LSTM) layers, one or more gradient recurrent unit (GRU) layers, and/or any suitable equivalent thereof. In an implementation, the one or more memory neural network layers are one or more long short-term memory layers of size 256.

The production policy network 520A may include an output layer 526A. The output layer 520A may be a fully connected output layer. The output layer 526A produces at least the one or more action values. The output layer 526A or portion thereof that produces the at least one or more action value may be referred to as the actor and may be considered to determine a policy π(s) for a given observed state, s, e.g. the one or more received observations. The output layer 526A of the production agent 502A may output further values in addition to the one or more action values, e.g. an estimated state values which will be described in relation to FIG. 5B, but does not need to. These other values are not needed for the selection of actions In some cases, the output layer 526A may be derived from a larger output layer, e.g. an output layer used in training, by removing portion of the output layer that do not relate to the action values.

The production agent 502A may include an action selector 528A. The action selector 528A may select one or more actions having the highest action values. However, when selecting the one or more actions, there may be a degree of entropy in determining the one or more actions, as described with respect to step 416 of FIG. 4. In production, the amount of entropy introduced may be the same as in training, or may be less than that introduced when training an agent as exploitation rather than exploration is the focus when using the agent. However, entropy is still useful in production in alleviating situations where the agent and, hence, the production entity 504, are stuck in a suboptimal state. The selected one or more actions are outputted by the action selector from the production agent 502A to the control interface 503A.

The control interface 503A receives the selected one or more actions and causes performance of the selected one or more actions by the production entity 504. The control interface 503A may facilitate the same or a similar agent being trained and/or used in a simulated environment and a real environment by abstracting the selected one or more actions from the implementation of their performance.

The production entity 504 refers to an entity that is in use rather than one that is being used to train the agent. The production entity 504 may be any suitable entity, e.g. any of the entities described in relation to the training entity 114 of the FIG. 1. In some embodiments, the production environment is a real entity, e.g. one of the physical apparatuses described with respect to the training entity 114 of FIG. 1. For example, the production entity may be an apparatus that is adapted to receive images of the physical environment of the apparatus, and the apparatus may include a steering device adapted to control the direction of the apparatus.

Agent in Training

FIG. 5A is a schematic diagram 500B illustrating an agent 502B undergoing training, referred to herein as the training agent 502B, by an agent trainer 530.

The schematic diagram 500B includes the training context 110 and the task obtainer 120, as these are utilized in the training of the training agent 502B.

An observation is received by the training agent 502B from the training environment 114. The observation may be of any of the types discussed in relation to step 412 of FIG. 4.

The training agent 502B includes the same components as the production agent 502A, and operates broadly similarly. However, a variation of the policy network 502B, the training policy network, may be used in place of the production policy network 520A, and a variation of the action selector 528B may be used in place of the action selector 528A.

The training policy network 520B may differ from that of the production policy network by utilizing a different output layer 526B. In addition to estimating action values, the output layer 526B may estimate a state value $V\pi(s)$, for the state, s, in addition to the action values. The portion of the output layer 526B that estimates the state value may be referred to as the critic. The estimated state value $V\pi(s)$ is utilized by the agent trainer 530 in training the agent 502B. It should be noted that the output layer 526B could also be used in the production agent 502A and the estimated state value discarded. The estimated state value and the action values are provided to the agent trainer 530.

The action selector 528B may differ from action selector 528A in that may introduce entropy to or increase the entropy of the selection of the one or more actions. The entropy may be introduced and/or increased to encourage exploration during training. The actions may be selected using any of the methods described with respect to step 416 of FIG. 4

The control interface 503B receives the selected one or more actions and causes performance of the selected one or more actions by the production entity 504. The control interface 503B may facilitate the same or a similar agent being trained and/or used in a simulated environment and a real environment by abstracting the selected one or more actions from the implementation of their performance.

The agent trainer 530 trains the training agent 502B by updating parameters, e.g. weights, of the training policy network 520B. As previously described, the parameters of the feature networks may be frozen and not updated during the training of the agent. Freezing the parameters of the feature networks during the training of the agent both prevents overfitting to the training environment, such that the agent functions better in the production environment, and speeds convergence during training of the agent, e.g. reduces the time and/or computational resources used to train the agent to a given level of performance. As described above, the method by which the tasks to be used for training are obtained also speeds convergence during training of the agent having the same benefits. The speeding of convergence by both freezing the parameters of the feature networks and using tasks obtained by the methods may, in combination, facilitate the training of agents, within a reasonable timeframe, on hardware where this otherwise would not be possible. For example, the training of agents on a desktop computer having a graphics processing unit in a timeframe of less than a day, less than a week, less than two weeks, less than a month, less than six-months may be achieved.

The agent trainer 530 may train the agent in accordance with an actor-critic method, whereby the parameters are optimized based on rewards for one or more actions, and on one more estimated state values. The rewards may be calculated based on the state of the training context subsequent to performing an action. For example, the rewards may be calculated in accordance with any of the methods described with respect to step 418 of FIG. 4. In calculating the reward, the task may be utilized as the reward may be calculated based on the one or more success criteria defined by the task. The estimated easiness values are determined using the critic of the output layer 526B. An example method for training the policy network 502B in accordance with above is proximal policy optimization (PPO) with clipping. In an implementation, the training agent 502B is trained using PPO with the following hyperparameters:

| | |
|---|---|
| number of minibatches | 1 |
| learning rate | 0.005 |
| clipping range ($\epsilon$) | 0.10 |
| discount factor ($\gamma$) | 0.99 |
| value fuction coefficient ($c_1$) | 0.5 |
| entropy coefficient ($\beta$ or $c_2$) | 0.01 |
| timesteps per policy update | 4000 |
| rollout workers | 12 |
| inner-loop epochs | 4 |
| GAE $\lambda$ | 0.95 |

When training has completed, the training agent 502B may be used as the production agent 502A.

Entity Control Method

Figure 6:
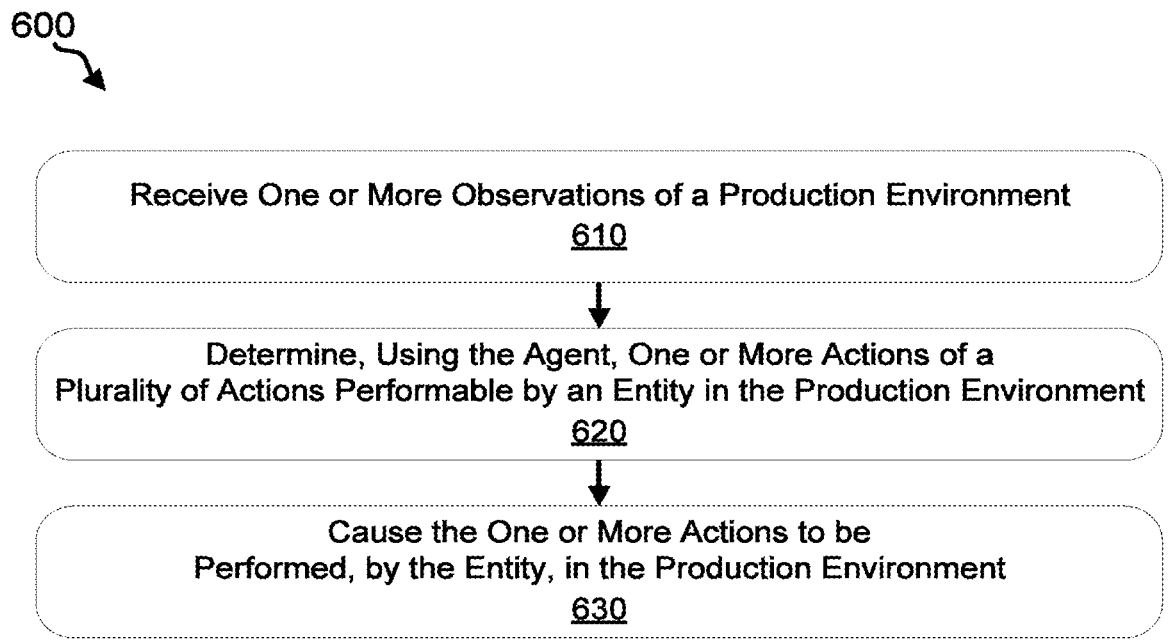
FIG. 6 is a flow diagram of a method for controlling an entity in a production environment.

FIG. 6 illustrates an example method for controlling an entity in a production environment using an agent. The agent may be the production agent 502A described with respect to FIG. 5A. For example, the entity may be an apparatus controlled by the agent to allow the apparatus to perform a navigation task in a physical environment. The example may be implemented as one or more computer-executable instructions executed one or more computing devices, e.g. the computing device 700 described in relation to FIG. 7.

In step 610, one or more observations of the production environment are received. The one or more observations be in any of the forms described with respect to the production environment 501 In the example described, the one or more observations of the production environment may be one or more images of the physical environment received by the apparatus.

In step 620, one or more actions of a plurality of actions performable by the entity in the production environment based on the one or more observations of the production environment are determined using the agent. The one or more actions may be determined in accordance with the methods described in relation to step 414 of FIG. 4 and/or with respect to the production agent 502A of FIG. 5A.

In step 630, one or more actions are caused to be performed by the entity in the production environment. The one or more actions may be caused to be performed in accordance with the methods described in relation to the control interface 503A and the production entity 504 of FIG. 5A.

Computing Device

Figure 7:
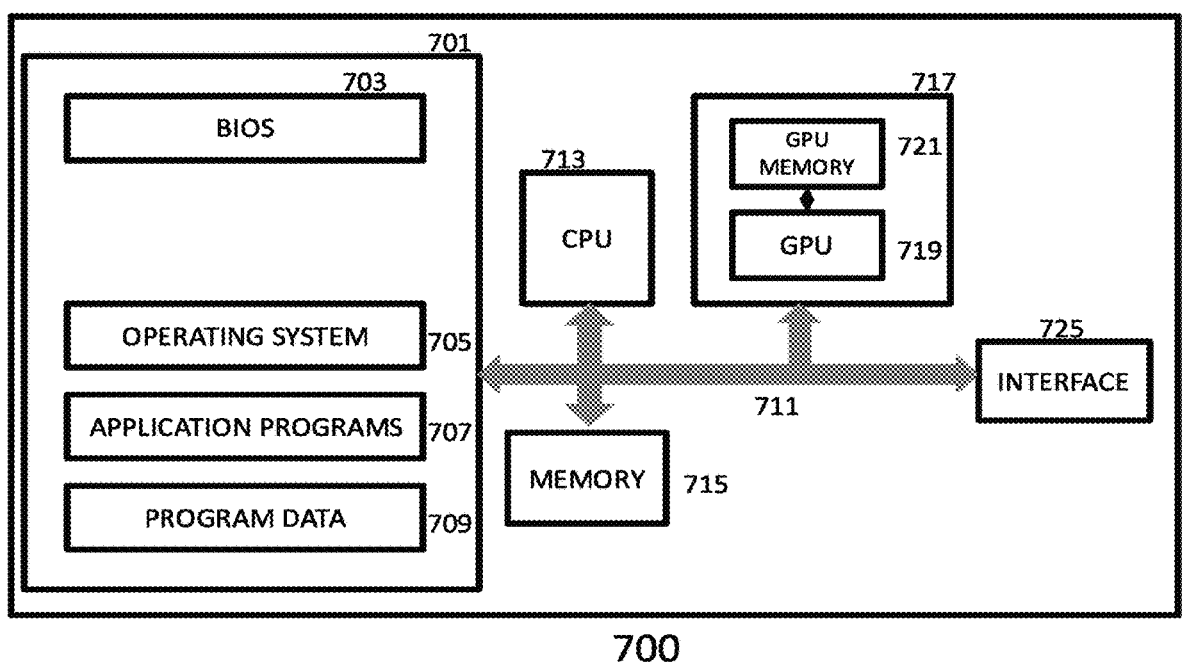
FIG. 7 is a schematic diagram of computing hardware using which example embodiments may be implemented.

FIG. 7 is a schematic of the hardware that can be used to implement methods in accordance with embodiments. It should be noted that this is just one example and other arrangements can be used.

The hardware comprises a computing section 700. In this particular example, the components of this section will be described together. However, it will be appreciated they are not necessarily co-located.

Components of the computing system 700 may include, but not limited to, a processing unit 713 (such as central processing unit, CPU), a system memory 701, a system bus 711 that couples various system components including the system memory 701 to the processing unit 713. The system bus 711 may be any of several types of bus structure including a memory bus or memory controller, a peripheral bus and a local bus using any of a variety of bus architecture etc. The computing section 700 also includes external memory 715 connected to the bus 711.

The system memory 701 includes computer storage media in the form of volatile/or non-volatile memory such as read-only memory. A basic input output system (BIOS) 703 containing the routines that help transfer information between the elements within the computer, such as during start-up is typically stored in system memory 701. In addition, the system memory contains the operating system 705, application programs 707 and program data 709 that are in use by the CPU 713.

Also, interface 725 is connected to the bus 711. The interface may be a network interface for the computer system to receive information from further devices. The interface may also be a user interface that allows a user to respond to certain commands et cetera.

In this example, a video interface 717 is provided. The video interface 717 comprises a graphics processing unit 719 which is connected to a graphics processing memory 721.

Graphics processing unit (GPU) 719 is particularly well suited to the training of the agent due to its adaptation to data parallel operations, such as neural network training. Therefore, in an embodiment, the processing for training the agent may be divided between CPU 713 and GPU 719.

It should be noted that in some embodiments different hardware may be used for the training of the agent and for performing tasks using the agent. For example, the training of the agent may occur on one or more local desktop or workstation computers or on devices of a cloud computing system, which may include one or more discrete desktop or workstation GPUs, one or more discrete desktop or workstation CPUs, e.g. processors having a PC-oriented architecture, and a substantial amount of volatile system memory, e.g. 16 GB or more. While, for example, performance of tasks by the agent may use mobile or embedded hardware, which may include a mobile GPU as part of a system on a chip (SoC) or no GPU; one or more mobile or embedded CPUs, e.g. processors having a mobile-oriented architecture, or a microcontroller-oriented architecture, and a lesser amount of volatile memory, e.g. less than 1 GB. The hardware used for training the agent may have significantly more computational power, e.g. be able to perform more operations per second and have more memory, than the hardware used for performing tasks using the agent. Using hardware having lesser resources is possible because performing tasks using the agent, e.g. by performing inference using one or more neural networks, is substantially less computationally resource intensive than training an agent, e.g. by training one or more neural networks. Furthermore, techniques can be employed to reduce the computational resources used for performing tasks using the agent, e.g. for performing inference using one or more neural networks. Examples of such techniques include model distillation and, for neural networks, neural network compression techniques, such as pruning and quantization.

Results of SPL Metric

Figure 8A:
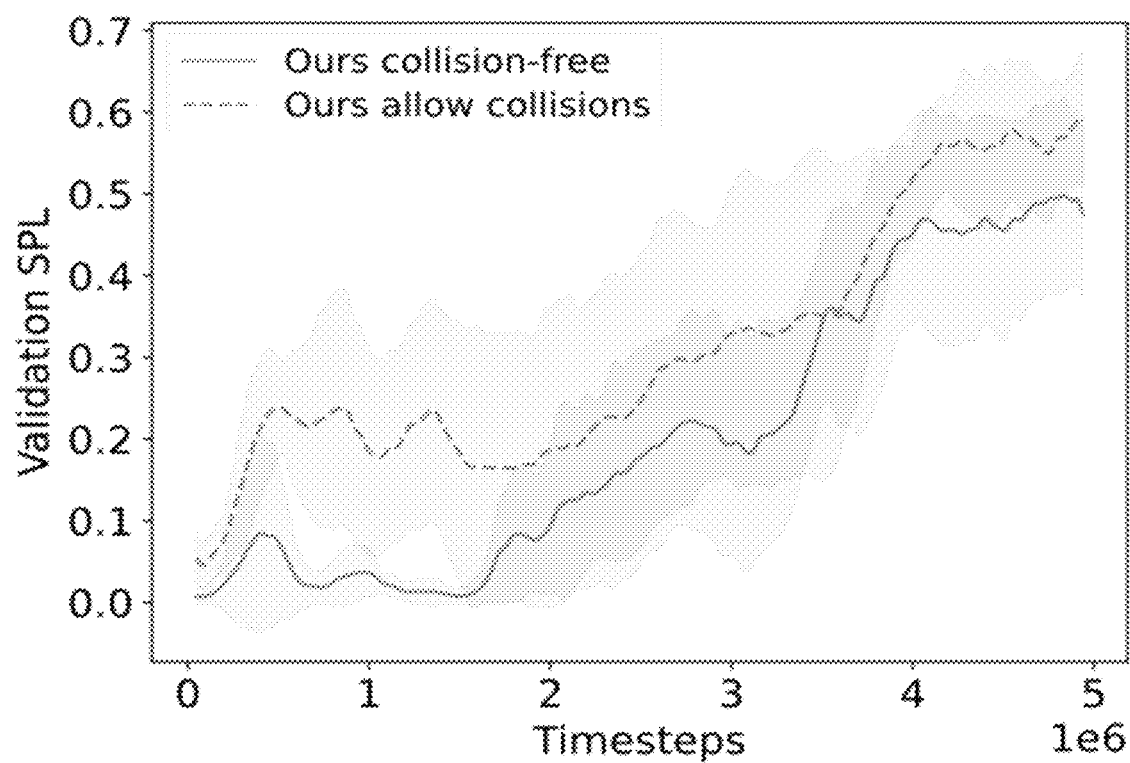
FIG. 8A is a graph comparing the Success weighted by (normalized inverse) Path Length (SPL) metric of example embodiments in performing a navigation task.

FIG. 8A is a graph showing the Success weighted by (normalized inverse) Path Length (SPL) metric of example embodiments in performing a navigation task.

The SPL metric is:

$$\frac{1}{N}\sum_{i=1}^{N} \mathbb{1}_{succ,i} \frac{l_i}{\max(l_i, p_i)}$$

where l is the length of the agent's path, p is the length of the shortest path from the start to goal, and N is the number of episodes.

The graph shows plots represent the mean and standard deviation of the validation SPL over a single train/test scene over five trials. Collision-free agents are important for Sim2Real transfer, e.g. using agents trained in a simulated environment in a real environment.

Figure 8B:
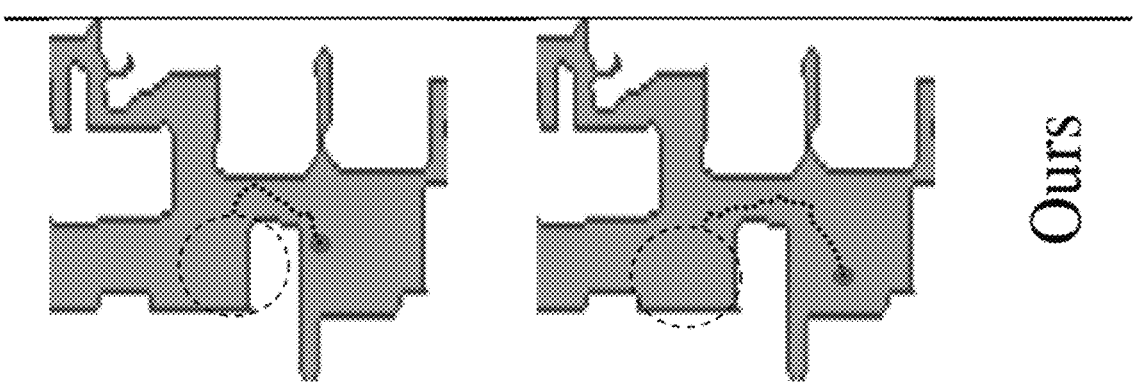
FIG. 8B is a floor plan diagram showing navigations performed using example embodiments.

FIG. 8B is a floor plan diagram comparing navigations performed using example embodiments. It should be noted that the path taken by the agent does not rely on collision mechanics to slide along walls, and embodiments avoid collisions.

Task Space Visualization

Figure 9:
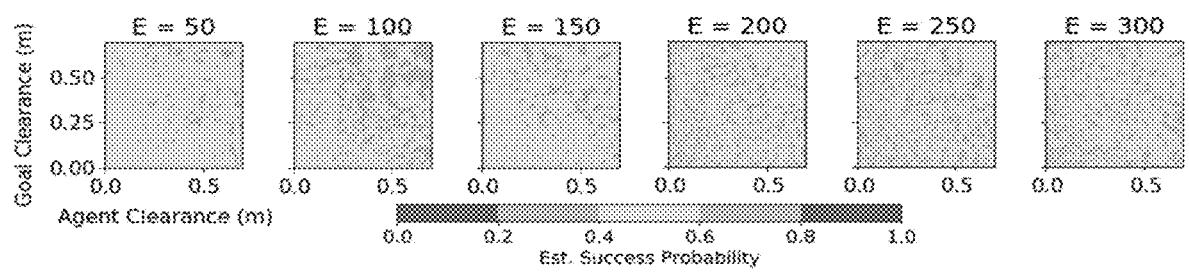
FIG. 9 is a visualization of a task space across different geometric properties at various training epochs.

FIG. 9 is a visualization of the estimated success probability, $f_\pi(h)$ estimate of a navigation task space across two different geometric properties, goal clearance and agent clearance, at various training epochs E. Over time, the task distribution shifts. Adaptive filtering accounts for this shift.

Ablation Experiment

Figure 10A:
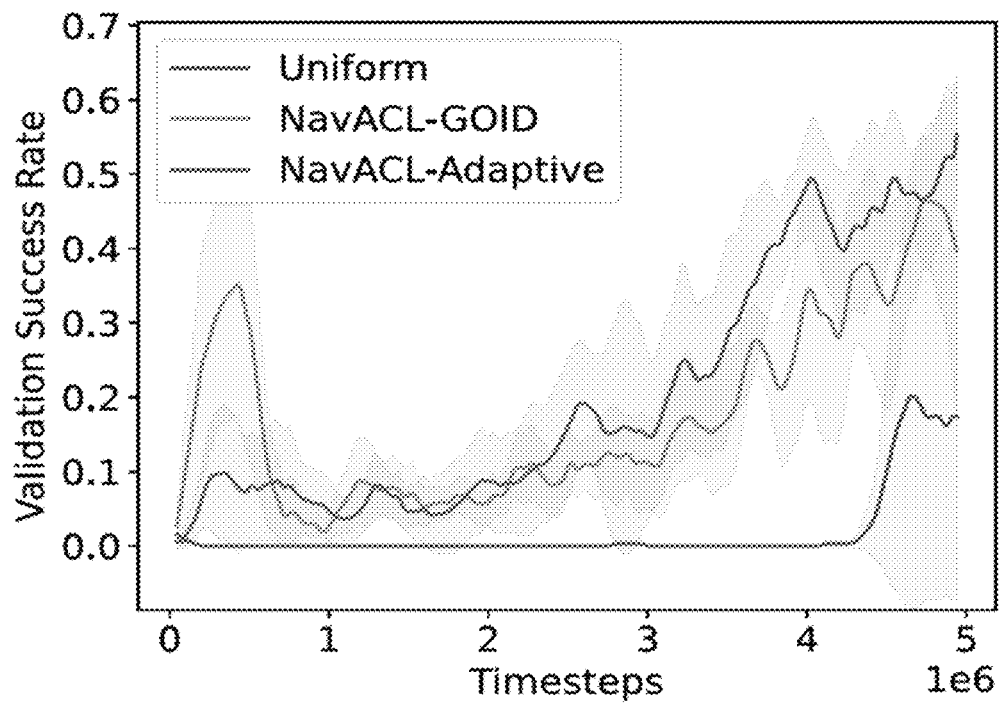
FIG. 10A is a graph comparing the validation episode success rate over three trials on a single visual navigation test-train environment for uniformly random tasks, NavACL-GOID and NavACL-Adaptive.
Figure 10B:
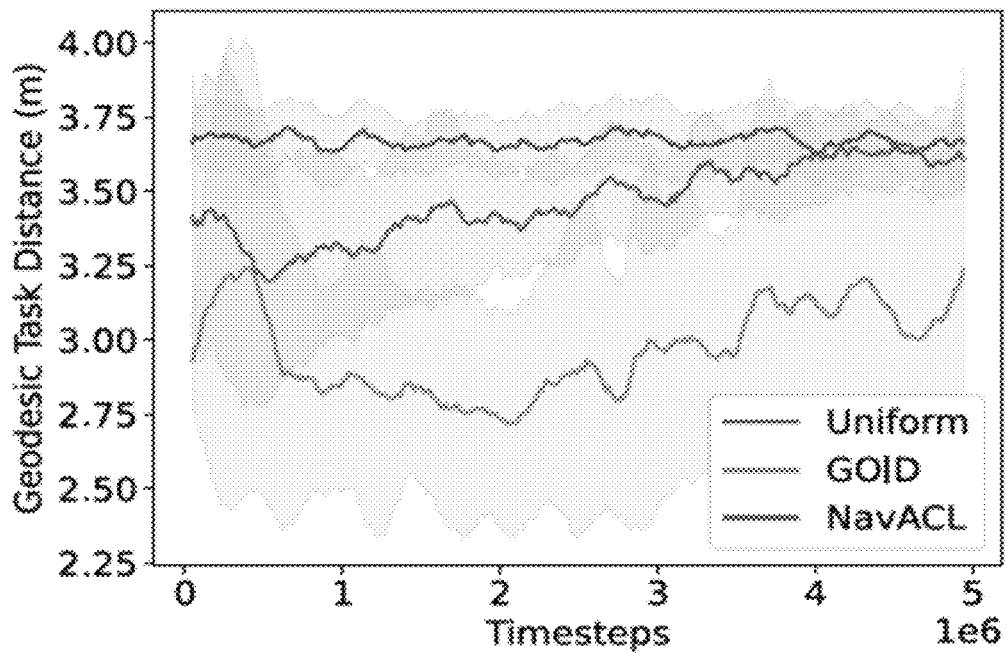
FIG. 10B is a graph illustrating the average geodesic task distance for uniformly random tasks, NavACL-GOID and NavACL-Adaptive.

FIGS. 10A and 10B relate to an experiment comparing the impact of obtaining tasks according to two embodiments, NavACL-GOID and NavACL-Adaptive, described herein on visual navigation to the method of obtaining uniformly random tasks. In the experiment, all parameters used for training the agent, e.g. the parameters used in proximal policy optimization, are held constant. Three navigation trials of five million samples are run on the Coopers town environment from the Gibson dataset. Uniformly random tasks are generated using Habitat's built-in task generator. For the method of obtaining random tasks, tasks generated by Habitat's built-in task generator are utilized. For NavACL-GOID, tasks may be generated using Habitat's built-in task generator, and those estimated to have an estimated success probability within an intermediate easiness range (i.e. an intermediate difficulty range) of 0.4-0.6 (inclusive) selected. For Nav-ACL adaptive, the tasks are obtained in accordance with algorithm 3, with the hyperparameters β=1, γ=0.1. As can be seen, both NavACL-GOID and NavACL-Adaptive significantly outperform obtaining uniformly random tasks. NavACL-Adaptive shows improvements over NavACL-GOID so NavACL-Adaptive is used in the remaining evaluation. Therefore, where NavACL is referred to below, it should be understood as referring to NavACL-Adaptive.

FIG. 10A is a graph comparing the validation episode success rate over three trials on a single visual navigation test-train environment for uniformly random tasks, NavACL-GOID and NavACL-Adaptive.

FIG. 10B is a graph illustrating the average geodesic task distance for uniformly random tasks, NavACL-GOID and NavACL-Adaptive. NavACL-Adaptive slowly increased the distance from start to goal. As time goes on and the policy learns, NavACL increases difficulty. NavACL-Adaptive approaches the distance for uniformly random tasks as time goes on, while NavACL-GOID does not.

Simulation Experiment

Figure 11A:
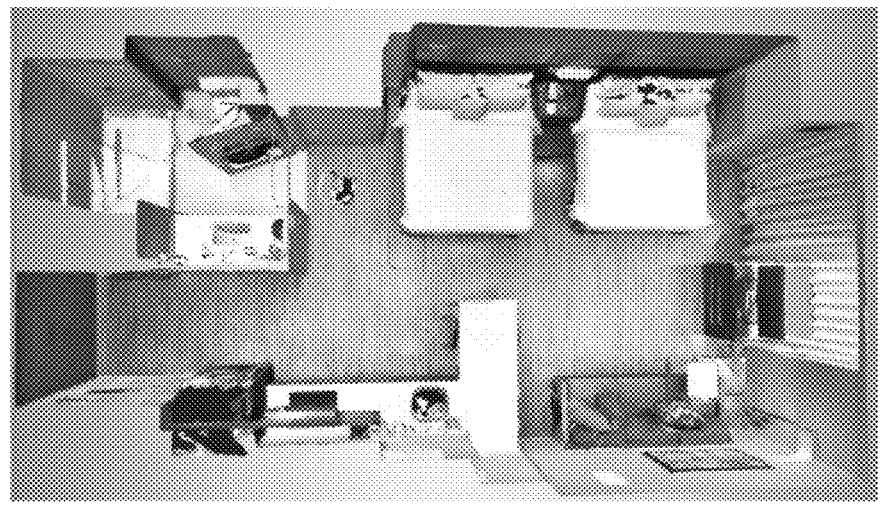
FIG. 11A is a picture of a first simulated environment in which agents in accordance with example embodiments may be trained and/or evaluated.
Figure 11B:
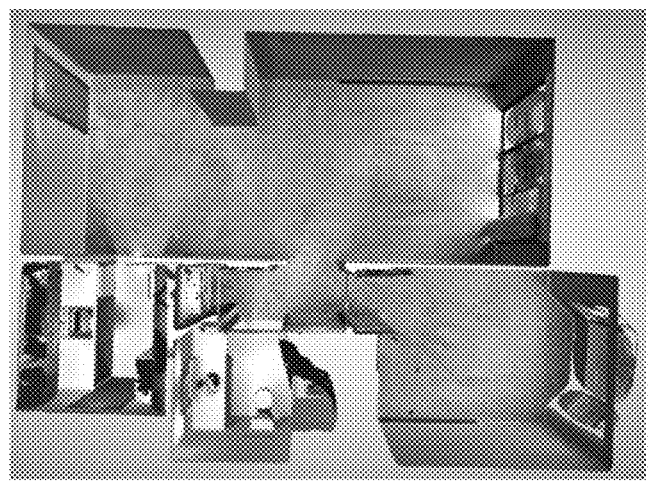
FIG. 11B is a picture of a second simulated environment in which agents in accordance with example embodiments may be trained and/or evaluated.
Figure 11C:
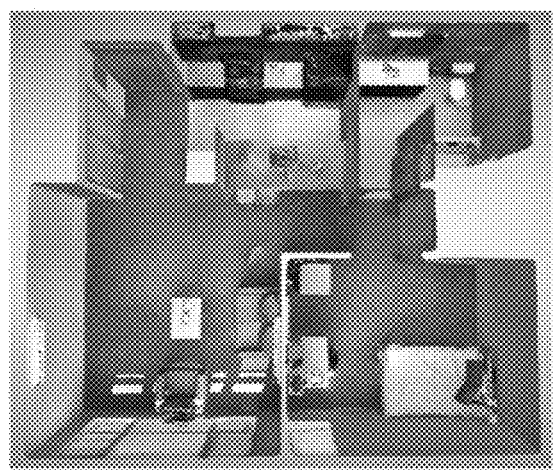
FIG. 11C is a picture of a third simulated environment in which agents in accordance with example embodiments may be trained and evaluated.

An agent is trained in accordance with example embodiments. Agents are evaluated over ten trials thirty episodes spread across three unseen test environment shown in FIG. 11A-11C. FIG. 11A shows the Cooperstown environment which is 40 m². FIG. 11B shows the Avonia environment which is 60 m². FIG. 11C shows the Hometown environment, which is 61 m².

The test set is generated randomly using same uniform sampling as the Habitat challenge data sets. The target object is an 11 cm radius football (soccer ball). The task performance attempts are limited to a maximum of 150 timesteps, e.g. fail if a time step limit of 150 timesteps are reached. It was found that increasing the maximum amount of timesteps beyond 150 results in little improvement. The plurality of performable actions are a rotation of ±30° and forward translation of 0.2 m.

A random agent selects random actions to provide a lower bound on performance. The NavACL agent is trained using depth, reshading (de-texturing and re-lighting), and semantic features using the NavACL-Adaptive for task obtainment. NavACL Zero-Short is identical to NavACL, but during testing the target is changed from the ball to a large vase to evaluate zero-shot semantic generalization to unseen targets of different shapes and sizes. Ten volunteers were recruited from varying backgrounds to establish an upper-bound on performance. The human agents are trained and tested in a manner akin to the agents. The volunteers played the training set until they were comfortable with controls, receiving the same observations and being able to perform the same actions as the agents. Results are presented in the table below and in relation to FIG. 12A-12B. The table refers to the agents described as 'Policy'. The table shows simulation results of collision-free agents over ten trials on unseen environments.

| Policy | Scene | Success Rate | | SPL | |
|---|---|---|---|---|---|
| | | μ | σ | μ | σ |
| Random | All | 0.03 | 0.03 | 0.02 | 0.03 |
| | Cooperstown | 0.07 | 0.00 | 0.06 | 0.00 |
| | Avonia | 0.01 | 0.00 | 0.01 | 0.00 |
| | Hometown | 0.00 | 0.00 | 0.00 | 0.00 |
| NavACL Zero-Shot | All | 0.36 | 0.21 | 0.17 | 0.10 |
| | Cooperstown | 0.55 | 0.11 | 0.25 | 0.08 |
| | Avonia | 0.43 | 0.04 | 0.20 | 0.02 |
| | Hometown | 0.09 | 0.06 | 0.06 | 0.03 |
| NavACL | All | 0.42 | 0.19 | 0.24 | 0.09 |
| | Cooperstown | 0.63 | 0.14 | 0.31 | 0.09 |
| | Avonia | 0.50 | 0.06 | 0.21 | 0.04 |
| | Hometown | 0.12 | 0.08 | 0.09 | 0.06 |
| Human | All | 0.79 | 0.20 | 0.56 | 0.15 |
| | Cooperstown | 0.76 | 0.22 | 0.54 | 0.17 |
| | Avonia | 0.89 | 0.13 | 0.63 | 0.13 |
| | Hometown | 0.72 | 0.19 | 0.51 | 0.13 |

Figure 12A:
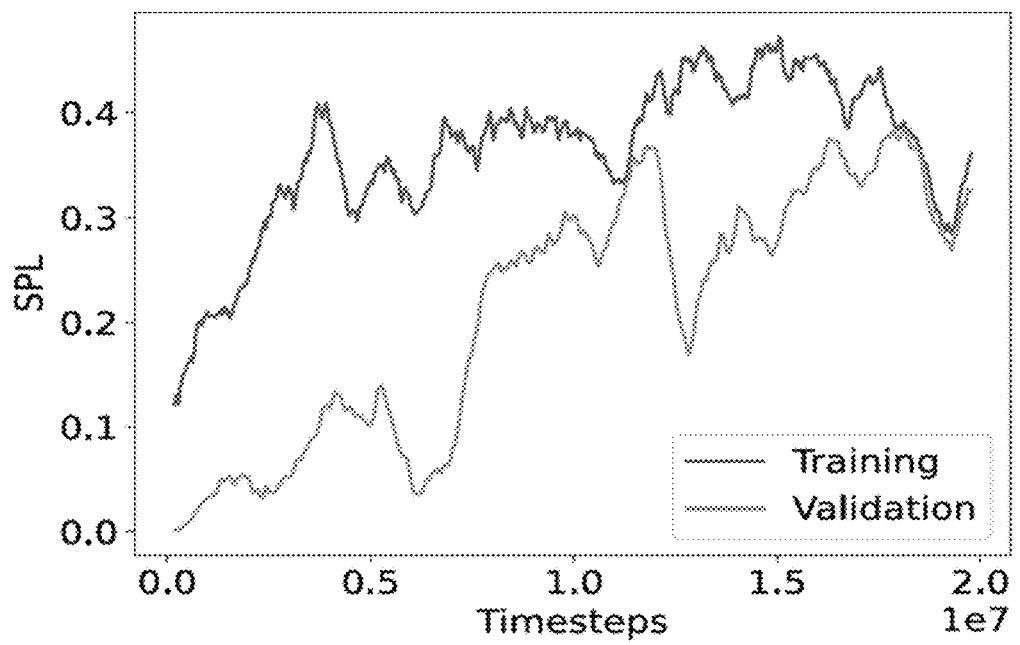
FIG. 12A is a graph comparing the SPL metric of an example embodiment of an agent on tasks on which the agent is trained and validation tasks during training.

FIG. 12A shows training and validation results for the NavACL agent using the SPL metric.

Figure 12B:
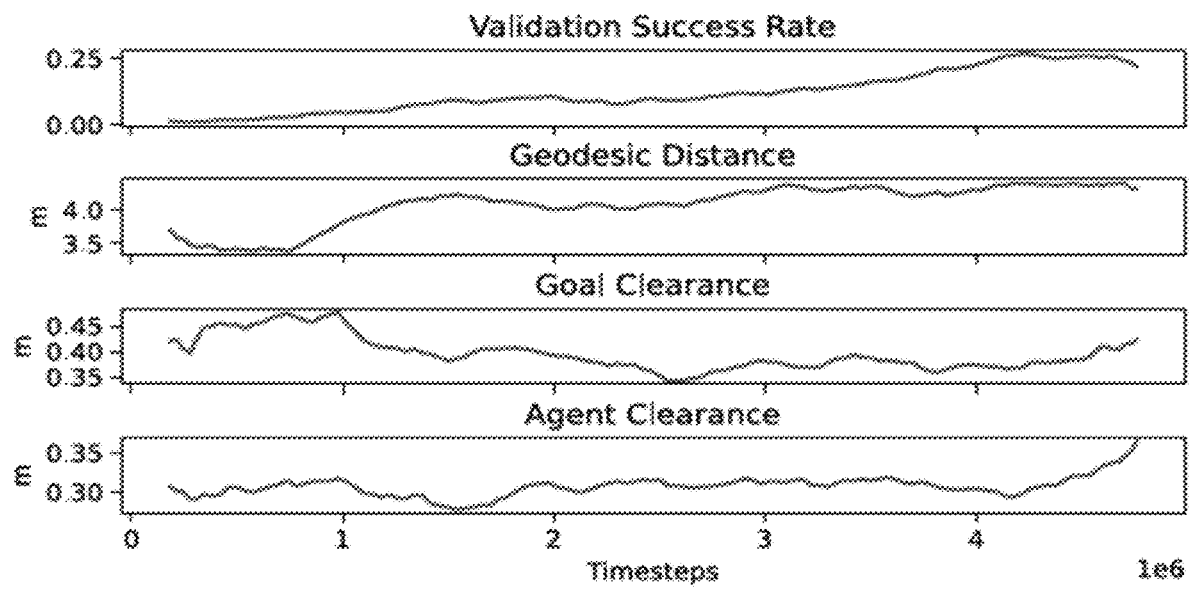
FIG. 12B illustrates a success rate of an example embodiment of an agent on validation tasks and geometric properties of tasks obtained during training of the agent.

FIG. 12B illustrates that as the NavACL agent improves, harder tasks are obtained using Nav-ACL adaptive. At the beginning, shorter paths (geodesic distance) and narrow corridors (agent clearance) help guide the agent. As the agent improves, the agent navigates without corridor guidance, and reaches goals placed closer to obstacles (goal clearance).

As can be seen from the results, the NavACL agent and the NavACL Zero-Shot agents are able to find semantically specified targets in simulation, performing drastically better than random, and, in the case of NavACL Zero-Shot, clearly exhibit zero-shot semantic generalization capability.

In the Cooperstown environment, agents are within one standard deviation of human-level performance in success rate, suggesting that they outperform some humans in some cases.

The shown results were limited by the amount of training that could be performed in the shown experiments. The model was trained for twenty million timesteps and previous experiments were still showing improvements at sixty million timesteps.

Evaluation of Agent Trained in Simulated Environment in a Real Environment

Using an agent trained in a simulated environment in a real environment may be referred to as Sim2Real Transfer. To evaluate the performance of the described agent in a real environment, the agent was transferred without modification to a Turtlebot3 wheeled robot (AGV) and a DJI Tello quadroptor (UAV).

The AGV uses wheel encoders for closed-loop control for motion primitives (single actions), but does not estimate odometry across actions. The AGV was tested on sevnt asks spanning three environments and three objects, one being an unseen object and being from an unseen semantic class. Wheel odometry is used to measure SPL for the AGV. The AGV did not experience a single collision over the 29 m it travelled during tests and was robust to actuator noise as well as wheel slip caused by terrain (hardwood, carpet and rugs). Results are shown in the table below.

| Scene | Target | Task Dist. (m) | SPL |
|---|---|---|---|
| Office 1 | Football | 2.95 | 0.92 |
| | Football | 3.09 | 0.53 |
| | Football | 2.92 | 0.42 |
| | Football | 1.67 | 0.18 |
| Office 2 | Football | 9.10 | 0.65 |
| House | Orange Football | 4.19 | 0.92 |
| House | Vase | 5.14 | 0.54 |

The UAV uses IR sensors to determine height and an IMU to obtain very noisy position estimates for motion primitives and hovering stability. A separate agent was not trained for the UAV. The agent trained with the AGV height and camera field of view was used. The AGV height and camera field of drastically differ from the UAV (0.2 m vs 0.75-1.5 m and 68° vs 47° respectively). Agents trained for the AGV showed surprising effectiveness on the UAV, suggesting a high degree of generalization. The UAV was able to fly in-between legs of a camera tripod, through doorways and even around moving people on many occasions without collision. This surprising generalization perform implies that a single navigation model may be trained for use on diverse types of robots that implement similar motion primitives.

Figure 13A:
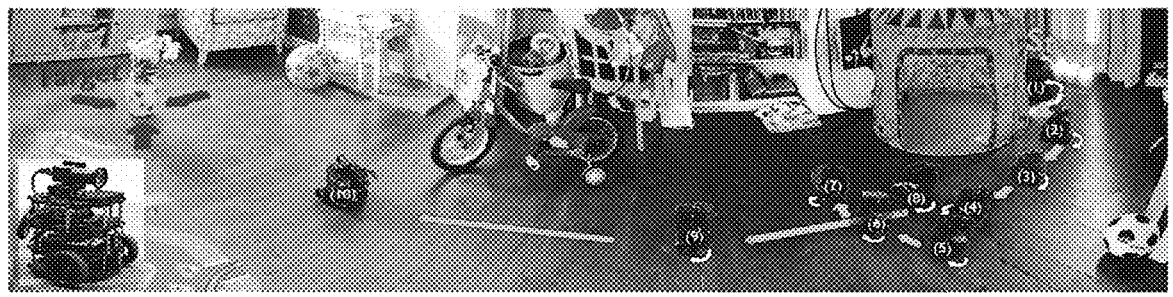
FIG. 13A is an illustration of an automated guided vehicle (AGV) being guided through an indoor physical environment using an example embodiment of an agent.

FIG. 13A is an illustration of an automated guided vehicle (AGV) being guided through a indoor physical environment using the agent. The AGV navigates to the vase target in the house scene, with several never-before-seen obstacles littering the path to the target. Previous semantic targets (football and pink star ball) used during training are present to emphasize zero-shot semantic navigation capability. The agent turned 360° (1) to evaluate its options, then took the path between the desk and tent (2), adjusted the trajectory towards the wide-open area in front of the blue tent (3), and rotated 360° (4). The agent explored the areas surrounding the bike, bookshelves, and the blue tent (5, 6, 7). Target detection occurred at (8), and the AGV made a beeline for the target (9, 10).

Figure 13B:
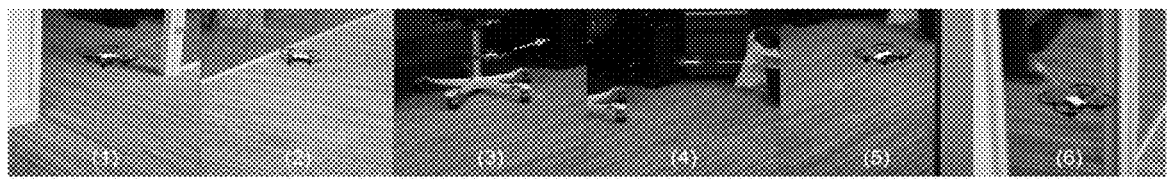
FIG. 13B is an illustration of an unmanned aerial vehicle (UAV) being guided through an indoor physical environment using an example embodiment of an agent.

FIG. 13B is an illustration of an unmanned aerial vehicle (UAV) being guided through an indoor physical environment using the agent. While flying down a hallway (1), the UAV notices an empty cubicle (2). It threads the needle, flying between the chair wheels and seat (3). After exploring the cubicle (4,5), it leaves and heads into the adjacent open office without collision (6).

Variations

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A computer-implemented method, comprising:
obtaining one or more navigation tasks, an agent being trained in a training context that is a situation for which the agent is trained to perform a task, the situation including at least (i) an entity that is a physical or simulated apparatus that is controlled by the agent and (ii) an environment of the entity, the agent being a system including one or more neural networks, the agent controlling the entity to perform a series of actions and to perform a specified task, an apparatus performing a navigation task in a physical environment of the apparatus, the apparatus receiving images of the physical environment of the apparatus, the apparatus including a steering device controlling a direction of the apparatus, and the obtaining the one or more navigation tasks including:
generating a first navigation task based on the environment of the entity, the generating of the first navigation task includes generating an initial state as an initial position for the entity and defining one or more success criteria including a target position for the entity;
scoring the first navigation task using a machine-learned model trained to estimate an easiness of tasks, the estimated easiness of tasks being a score indicating a success probability to which the entity is navigated by the agent to the target position in the environment of the entity; and
in response to the score satisfying a first selection criterion, selecting the first navigation task having the score satisfying the first selection criterion as one of the one or more navigation tasks; and
training the agent using a reinforcement learning method including performing, by the entity, the one or more navigation tasks using images of the environment of the entity, wherein
the first navigation task includes an initial position and a target position for the training entity, the initial position and the target position being randomly generated and restricted within a navigable area,
the scoring the first navigation task is based on one or more geometric properties of the navigation task, and
the first navigation task having the score satisfying the first selection criterion indicates a greater value than another navigation task having another score not satisfying the first selection criterion in terms of the success probability.

2. The method of claim 1, wherein the machine-learned model is trained to estimate the easiness of tasks based on a training set including, for each of a plurality of navigation tasks, one or more properties of each navigation task and an indication of whether an attempt to perform the first navigation task satisfied a navigation task success criterion.

3. The method of claim 2, wherein the navigation task success criterion was satisfied if the entity was navigated by the agent to a target location in the environment of the entity.

4. The method of claim 1, wherein the machine-learned model is trained in conjunction with the agent.

5. The method of claim 1, wherein
the score indicates that the first navigation task is of an intermediate easiness if the score is within a determined range, and
the score satisfies the first selection criterion if the first navigation task having the score is of the intermediate easiness.

6. The method of claim 5, wherein determining the determined range includes:
generating a plurality of navigation tasks;
scoring, using the machine-learned model, the plurality of navigation tasks; and
calculating the determined range based on a corresponding plurality of scores of each of the plurality of navigation tasks.

7. The method of claim 1, wherein obtaining the one or more navigation tasks includes:
generating a second navigation task different from the first navigation task, the second navigation task being generated randomly;
scoring the second navigation task using the machine-learned model trained to estimate the easiness of tasks; and
in response to a second score satisfying a second selection criterion, the second score being acquired by scoring the second navigation task, selecting the second navigation task having the second score satisfying the second selection criterion as one of the one or more navigation tasks, the second selection criterion being the same as or different from the first selection criterion.

8. The method of claim 1, wherein
a second score acquired by scoring a second navigation task different from the first navigation task indicates that the second navigation task is easy if the second score is greater than a threshold score,
the second score satisfies a second selection criterion if the second score indicates that the second navigation task is easy, and
the second selection criterion is the same as or different from the first selection criterion.

9. The method of claim 8, wherein determining the threshold score includes:
generating a plurality of navigation tasks;
scoring, using the machine-learned model, the plurality of navigation tasks; and
calculating the threshold score based on a corresponding plurality of scores of each of the plurality of navigation tasks.

10. The method of claim 1, wherein performing, by the entity, the one or more navigation tasks using the images of the environment of the entity includes:
performing one or more action steps, each action step comprising:
receiving one or more images of the environment of the entity;
determining, using the agent, one or more actions of a plurality of actions performable by the entity in the environment of the entity based on the one or more images;
causing the determined one or more actions to be performed; and calculating a reward for training the agent using the reinforcement learning method based on an updated state of the training context and a navigation task success criterion.

11. The method of claim 10, wherein the calculated reward is increased in response to the updated state of the training context being different from previous states of the training context.

12. The method of claim 11, wherein the calculated reward is decreased in response to the updated state of the training context indicating that the training entity has collided with one or more objects in the training environment.

13. The method of claim 1, wherein the entity is a simulated entity and the environment of the entity is a simulated environment.

14. The method of claim 1, wherein the agent includes:
one or more feature networks configured to process one or more images to determine one or more latent features; and
a policy network configured to process the one or more latent features to determine one or more action values for one or more actions performable by the entity in the environment of the entity.

15. The method of claim 14, wherein the one or more feature networks are pretrained using a plurality of images of a physical environment.

16. The method of claim 15, wherein parameters of the one or more feature networks are frozen when training the agent.

17. The method of claim 14, wherein the one or more feature networks include one or more semantic target feature networks.

18. A computer-implemented method, comprising:
receiving one or more images of a physical environment of an apparatus, the apparatus being controlled to perform a navigation task in the physical environment of the apparatus and a steering device controlling a direction of the apparatus;
determining, using an agent, one or more actions of a plurality of actions performable by the apparatus based on the one or more images; and
causing the one or more actions to be performed by the apparatus, wherein
the agent is trained by a computer-implemented method including:
obtaining one or more navigation tasks, the agent being trained in a training context that is a situation for which the agent is trained to perform a task, the situation including at least (i) an entity that is a physical or simulated apparatus that is controlled by the agent and (ii) an environment of the entity, the agent being a system including one or more neural networks, the agent controlling the entity to perform a series of actions and to perform a specified task, and the obtaining the one or more navigation tasks including:
generating a first navigation task based on the environment of the entity, the generating of the first navigation task includes generating an initial state as an initial position for the entity and defining one or more success criteria including a target position for the entity;
scoring the first navigation task using a machine-learned model trained to estimate an easiness of tasks, the score being a success probability to which the entity is navigated by the agent to the target position in the environment of the entity; and
in response to a score satisfying a first selection criterion, selecting the first navigation task having the score satisfying the first selection criterion as one of the one or more navigation tasks; and
training the agent using a reinforcement learning method including performing, by the entity, the one or more navigation tasks using images of the environment of the entity,
the first navigation task includes an initial position and a target position for the training entity, the initial position and the target position being randomly generated and restricted within a navigable area,
the scoring the first navigation task is based on one or more geometric properties of the navigation task, and
the first navigation task having the score satisfying the first selection criterion indicates a greater value than another navigation task having another score not satisfying the first selection criterion in terms of the success probability.

19. A system, comprising:
one or more processors configured to:
obtain one or more navigation tasks, an agent being trained in a training context that is a situation for which the agent is trained to perform a task, the situation including at least (i) an entity that is a physical or simulated apparatus that is controlled by the agent and (ii) an environment of the entity, the agent being a system including one or more neural networks, the agent controlling the entity to perform a series of actions and to perform a specified task, an apparatus performing a navigation task in a physical environment of the apparatus, the apparatus receiving images of the physical environment of the apparatus, the apparatus including a steering device controlling a direction of the apparatus, and the obtaining the one or more navigation tasks including:
generating a first navigation task based on the environment of the entity, the generating of the first navigation task includes generating an initial state as an initial position for the entity and defining one or more success criteria including a target position for the entity;
scoring the first navigation task using a machine-learned model trained to estimate an easiness of tasks, the score being a success probability to which the entity is navigated by the agent to the target position in the environment of the entity; and
in response to a score satisfying a first selection criterion, selecting the first navigation task having the score satisfying the first selection criterion as one of the one or more navigation tasks; and
train the agent using a reinforcement learning method including performing, by the entity, the one or more navigation tasks using images of the environment of the entity, wherein
the first navigation task includes an initial position and a target position for the training entity, the initial position and the target position being randomly generated and restricted within a navigable area,
the scoring the first navigation task is based on one or more geometric properties of the navigation task,
the first navigation task having the score satisfying the first selection criterion indicates a greater value than another navigation task having another score not satisfying the first selection criterion in terms of the success probability, the agent includes:
- one or more feature networks configured to process one or more images to determine one or more latent features; and
- a policy network configured to process the one or more latent features to determine one or more action values for one or more actions performable by the entity in the environment of the entity, and the one or more feature networks include one or more semantic target feature networks.

20. The system of claim 19, further comprising the apparatus performing the navigation task in the physical environment of the apparatus, receiving the images of the physical environment of the apparatus, and including the steering device controlling the direction of the apparatus.

* * * * *